United States Patent
Okada et al.

(10) Patent No.: US 7,581,137 B2
(45) Date of Patent: Aug. 25, 2009

(54) STORAGE APPARATUS AND STORAGE APPARATUS POWER SUPPLY FAILURE MANAGEMENT METHOD

(75) Inventors: Naoki Okada, Odawara (JP); Hidehiro Nagaya, Odawara (JP); Shin Nakamura, Hadano (JP)

(73) Assignee: Hitachi, Ltd., Tokyo (JP)

( * ) Notice: Subject to any disclaimer, the term of this patent is extended or adjusted under 35 U.S.C. 154(b) by 484 days.

(21) Appl. No.: 11/473,032

(22) Filed: Jun. 23, 2006

(65) Prior Publication Data

US 2007/0260918 A1    Nov. 8, 2007

(30) Foreign Application Priority Data

Apr. 18, 2006    (JP) ............................. 2006-114039

(51) Int. Cl.
*G06F 11/00* (2006.01)
(52) U.S. Cl. .......................................... 714/24; 714/22
(58) Field of Classification Search ................... 714/22, 714/24
See application file for complete search history.

(56) References Cited

U.S. PATENT DOCUMENTS

| | | | | |
|---|---|---|---|---|
| 5,835,780 | A * | 11/1998 | Osaki et al. ................. | 713/300 |
| 6,199,175 | B1 | 3/2001 | Inoue et al. | |
| 6,243,838 | B1 * | 6/2001 | Liu et al. ...................... | 714/57 |
| 6,345,369 | B1 * | 2/2002 | Kitamorn et al. ............. | 714/14 |
| 6,629,248 | B1 * | 9/2003 | Stachura et al. ............. | 713/340 |
| 6,691,248 | B1 * | 2/2004 | Nishijima et al. ............. | 714/14 |
| 6,865,685 | B2 * | 3/2005 | Hammond et al. .......... | 713/340 |
| 6,904,541 | B1 * | 6/2005 | MacArthur et al. ........... | 714/14 |
| 7,051,233 | B2 * | 5/2006 | Fukumori et al. ............. | 714/14 |
| 7,114,098 | B2 * | 9/2006 | Hammond et al. ............ | 714/22 |
| 7,275,182 | B2 * | 9/2007 | Egan et al. ................... | 714/22 |
| 7,287,187 | B2 * | 10/2007 | Williams et al. .............. | 714/14 |
| 7,330,990 | B2 * | 2/2008 | Sato et al. ................... | 713/340 |
| 7,363,518 | B2 * | 4/2008 | Critz et al. .................. | 713/300 |
| 7,392,429 | B2 * | 6/2008 | Frank et al. .................. | 714/24 |
| 7,464,292 | B2 * | 12/2008 | Zansky et al. ................ | 714/14 |
| 2004/0093533 | A1 * | 5/2004 | Chapuis et al. .............. | 714/22 |

(Continued)

FOREIGN PATENT DOCUMENTS

JP          05-324367        12/1993

(Continued)

*Primary Examiner*—Marc Duncan
(74) *Attorney, Agent, or Firm*—Antonelli, Terry, Stout & Kraus, LLP.

(57) ABSTRACT

A storage apparatus according to the present invention can store information related to a power supply abnormality after shutting down the principal functions of a data processing board when a power supply abnormality occurs in a data processing board. A power supply controller of a data processing board mounted in the storage apparatus monitors the operational status of DC/DC power supplies mounted to the data processing board, on the basis of detection signals from a voltage detection circuit. When a power supply abnormality is detected, the power supply controller immediately shuts down the operation of all the DC/DC power supplies. Shutting down the DC/DC power supplies also shuts down the principal functionality of the data processing board. Then, after storing information related to the power supply abnormality in memory, the power supply controller shuts down the auxiliary power supply. The information stored in memory can be transmitted to a management apparatus by way of an intermediary apparatus, which is another data processing board or the like.

3 Claims, 23 Drawing Sheets

U.S. PATENT DOCUMENTS

| | | | |
|---|---|---|---|
| 2004/0193955 A1* | 9/2004 | Leete et al. | 714/22 |
| 2005/0177780 A1* | 8/2005 | Chang | 714/47 |
| 2006/0020855 A1 | 1/2006 | Okada et al. | |
| 2006/0242462 A1* | 10/2006 | Kasprzak et al. | 714/22 |
| 2007/0174698 A1* | 7/2007 | Bailey et al. | 714/22 |

FOREIGN PATENT DOCUMENTS

| | | |
|---|---|---|
| JP | 2003-036127 | 2/2003 |
| JP | 2006-031630 | 2/2006 |

* cited by examiner

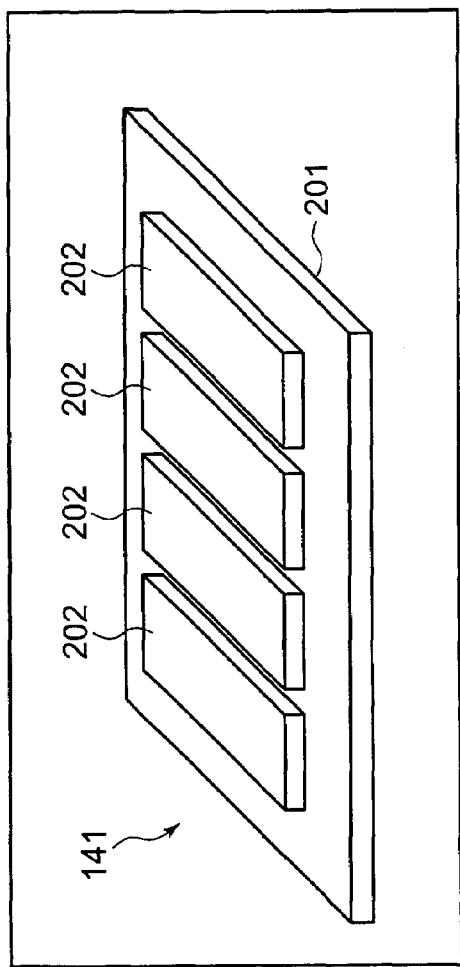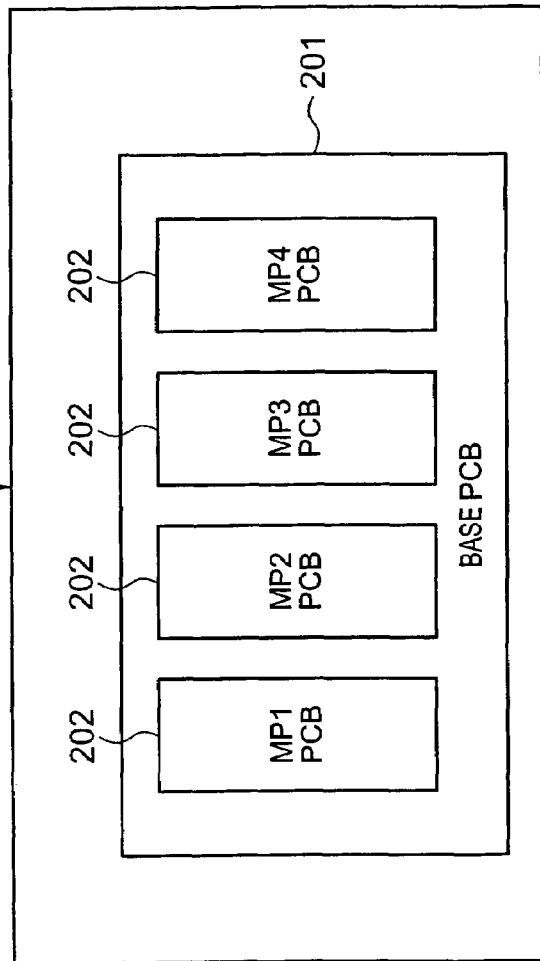

STORAGE APPARATUS AND STORAGE APPARATUS POWER SUPPLY FAILURE MANAGEMENT METHOD

CROSS-REFERENCE TO RELATED APPLICATIONS

This application relates to and claims priority from Japanese Patent Application No. 2006-114039 filed on Apr. 18, 2006, the entire disclosure of which is incorporated herein by reference.

BACKGROUND OF THE INVENTION

1. Field of the Invention

The present invention relates to a storage apparatus and a storage apparatus power failure management method.

2. Description of the Related Art

A storage apparatus comprises a storage part, which is connected to a plurality of hard disk drives in an array, and provides a logical storage region (logical volume) to a server or other such host computer (hereinafter, "host").

To enhance reliability and availability, a storage apparatus provides a host with redundant storage regions based on RAID (Redundant Array of Independent Disks). A storage apparatus such as this comprises at least one or more control boards. This control board controls the exchange of data with the host, and the exchange of data with a hard disk drive.

When a failure of one sort or another occurs in a control board, technology constituted such that shutting down only the control board in which this failure occurred makes it possible to replace the control board in which the failure occurred without halting the operation of the storage apparatus is known (Japanese Laid-open Patent No. 2003-36127).

Technology constituted such that, when a failure occurs in a control board, it is possible to individually control the supply of power to each of a plurality of functionalities of the control board, is also known (Japanese Laid-open Patent No. 2006-31630).

Technology for enhancing the maintainability of a system by collecting information related to a failure that occurs inside a digital computing system, and storing this failure information in nonvolatile memory is also known (Japanese Laid-open Patent No. H5-324367).

A control board monitors the power supply voltage, and when it detects a power supply voltage abnormality, it immediately shuts down the supply of all power inside the control board. This is because when a digital circuit malfunctions due to an abnormality of the power supply voltage, this malfunction is likely to cause the reading and writing of data that is not accurate. For example, in a LSI (Large Scale Integration), which utilizes a plurality of types of power supply voltages, if one of those types of power supply voltage continues to operate for a long period of time in a shutdown state, this could also result in device damage. Accordingly, in order to maintain safety and reliability, a control board immediately shuts down the supply of all power when an abnormality occurs in any one of the power supply voltages.

Thereafter, the control board in which the power supply abnormality was detected is removed from the storage apparatus by maintenance personnel, and sent to the vendor repair center. However, since there is no information indicating which of the control board's power supply voltages generated an abnormality, a worker at the repair center installs the control board in which the power supply abnormality occurred in a storage apparatus for test use, and attempts to recreate the power supply abnormality. The worker pinpoints the cause of the failure by observing the voltage waveforms of numerous locations on the control board. Therefore, it takes a long time to specify the malfunctioning member and figure out the cause of the failure, making the workability of inspection work and analytical work low.

SUMMARY OF THE INVENTION

With the foregoing in mind, an object of the present invention is to provide a storage apparatus and storage apparatus power supply failure management method constituted so as to be able to enhance the workability of failure analysis work by maintaining information related to a power failure on a data processing board. Another object of the present invention is to provide a storage apparatus and storage apparatus power supply failure management method constituted so as to ensure reliability and enhance maintainability by using the power supply voltage of an auxiliary power supply and writing information related to a power-failure into a storage part subsequent to immediately shutting down the power supply part in which the failure was detected. Additional objects of the present invention should become clear from the disclosures of the embodiments explained hereinbelow.

To solve for the above-mentioned problems, a storage apparatus according to one aspect of the present invention is a storage apparatus for providing a storage region to a host, and comprises at least one data processing board. A data processing board comprises at least one power supply part for supplying power to a load; a detection part for detecting the operating state of a power supply part, and outputting a signal; at least one power control part for controlling the operation of a power supply part on the basis of a signal from the detection part; a storage part for storing monitoring results; and an auxiliary power supply part for enabling writing information into the storage part even when the operation of a power supply part has been shut down. A power control part is constituted so as to monitor the operating state of a power supply part, store the results of this monitoring in the storage part, and shut down operation of the power supply part when a failure is detected in the power supply part.

In an embodiment of the present invention, an interface part for outputting outside the data processing board monitoring results, which are stored in the storage part, is provided.

In an embodiment of the present invention, a data processing board comprises a plurality of power control parts for controlling the operation of respectively different power supply parts, and each power control part, under prescribed circumstances, monitors the respective operating states of the power supply part under its control, and stores the results of monitoring in the storage part.

In an embodiment of the present invention, a plurality of data processing boards are provided, and when a power failure is detected by the power control part of one of the respective data processing boards, the occurrence of a power failure is notified from one data processing board to another data processing board.

In an embodiment of the present invention, when a notification from one data processing board is received by another data processing board, the other data processing board notifies the host of the occurrence of a power failure.

In an embodiment of the present invention, a plurality of data processing boards are provided, and information on status detection, which is stored in the storage part of one of the respective data processing boards, can be accessed from another data processing board.

In an embodiment of the present invention, when a power control part determines, based on a signal from the detection part, that a failure has occurred in a power supply part, the results of monitoring, related to the power supply part in which the failure has occurred, are stored in the storage part.

In an embodiment of the present invention, a power control part stores monitoring results in the storage part after shutting down the operation of the power supply part.

In an embodiment of the present invention, a power control part monitors the operating state of a power supply part on a regular basis, and stores the results of monitoring in the storage part.

In an embodiment of the present invention, when a prescribed condition, which has been set beforehand, is detected, a power supply control part monitors the operating state of a power supply part, and stores the results of monitoring in association with the detected prescribed condition in the storage part. As a prescribed condition, for example, the detection of a power supply voltage abnormality, the passage of a prescribed period of time from the last monitoring operation, and the detection of a prescribed status change (operation), which was set beforehand, can be cited. As a prescribed status change, for example, a new installation, a replacement, an addition, a deletion, in-operation, and suspended can be cited.

In an embodiment of the present invention, only prescribed information from among the monitoring results stored in the storage part is selected and read out.

In an embodiment of the present invention, a power control part is constituted such that, when the occurrence of a failure is detected in a power supply part, it shuts down the operation of an auxiliary power supply after storing the results of monitoring at the time the failure has been detected in the storage part.

A storage system according to another aspect of the present invention is a storage system having a storage apparatus, which controls the exchange of data between a host and a storage device, and a management apparatus, which is connected to the storage apparatus, and (1) the storage apparatus comprises a first data processing board and a second data processing board for respectively processing the exchange of data with a host and/or a storage device, and (2) the first data processing board and second data processing board are communicatively interconnected, and are both constituted comprising a first board, and a plurality of second boards, which are disposed on the first board in an integrated condition. (3) The first board is constituted comprising a data transmission circuit for transmitting data; a plurality of first power supply parts for supplying power to the data transmission circuit; a first voltage detection part, which detects the output voltages of the respective first power supply parts, and outputs a signal; a first power control part, which controls the operations of the respective first power supply parts based on a signal from the first voltage detection part; a storage part; and an interface part for outputting information stored in the storage part. (4) The respective second boards are constituted comprising a microprocessor circuit; a plurality of second power supply parts for supplying power to the microprocessor circuit; a second voltage detection part, which detects the output voltages of the respective second power supply parts, and outputs a signal; and a second power control part, which controls the operations of the respective second power supply parts based on a signal from the second voltage detection part. (5) A first power control part, under prescribed circumstances, stores the results of monitoring the operating states of the respective first power supply parts in the storage part, and the second power control part, under prescribed circumstances, stores the results of monitoring the operating states of the respective second power supply parts in the storage part, (6) the microprocessor circuit of the first data processing board and the microprocessor circuit of the second data processing board are constituted so as to be able to respectively access the storage part of the first data processing board and the storage part of the second data processing board, and to be able to output monitoring results stored in the storage parts to the management apparatus, and (7) the microprocessor circuit of the first data processing board and the microprocessor circuit of the second data processing board are constituted so as to be able to acquire only one portion of information from among the monitoring results stored in a storage part.

A storage apparatus power supply failure management method according to yet another aspect of the present invention is a method for managing a power supply failure in a storage apparatus having a plurality of data processing boards, and the respective data processing boards each comprise a plurality of power supply parts, which supply power to a load, the management method for executing the steps of detecting the operating states of the respective power supply parts; determining whether or not a failure has occurred in the respective power supply parts based on the detected operating states; shutting down all operation of the power supply parts when determined that a failure has occurred in any of the power supply parts; storing information related to a power supply part, in which a failure has been detected, in a storage part; reading out the information stored in the storage part; and analyzing the read-out information.

BRIEF DESCRIPTION OF THE DRAWINGS

FIG. 8 is a diagram schematically showing the board structure of a data processing board, which is utilized in a storage apparatus related to a second embodiment;

DESCRIPTION OF THE PREFERRED EMBODIMENTS

An embodiment of the present invention will be explained below on the basis of the figures. In this embodiment, as will be described hereinbelow, information related to a power supply abnormality that occurs inside the control package is maintained inside this control package. Then, means for accessing the power supply abnormality-related information maintained in this control package is provided.

Figure 1:
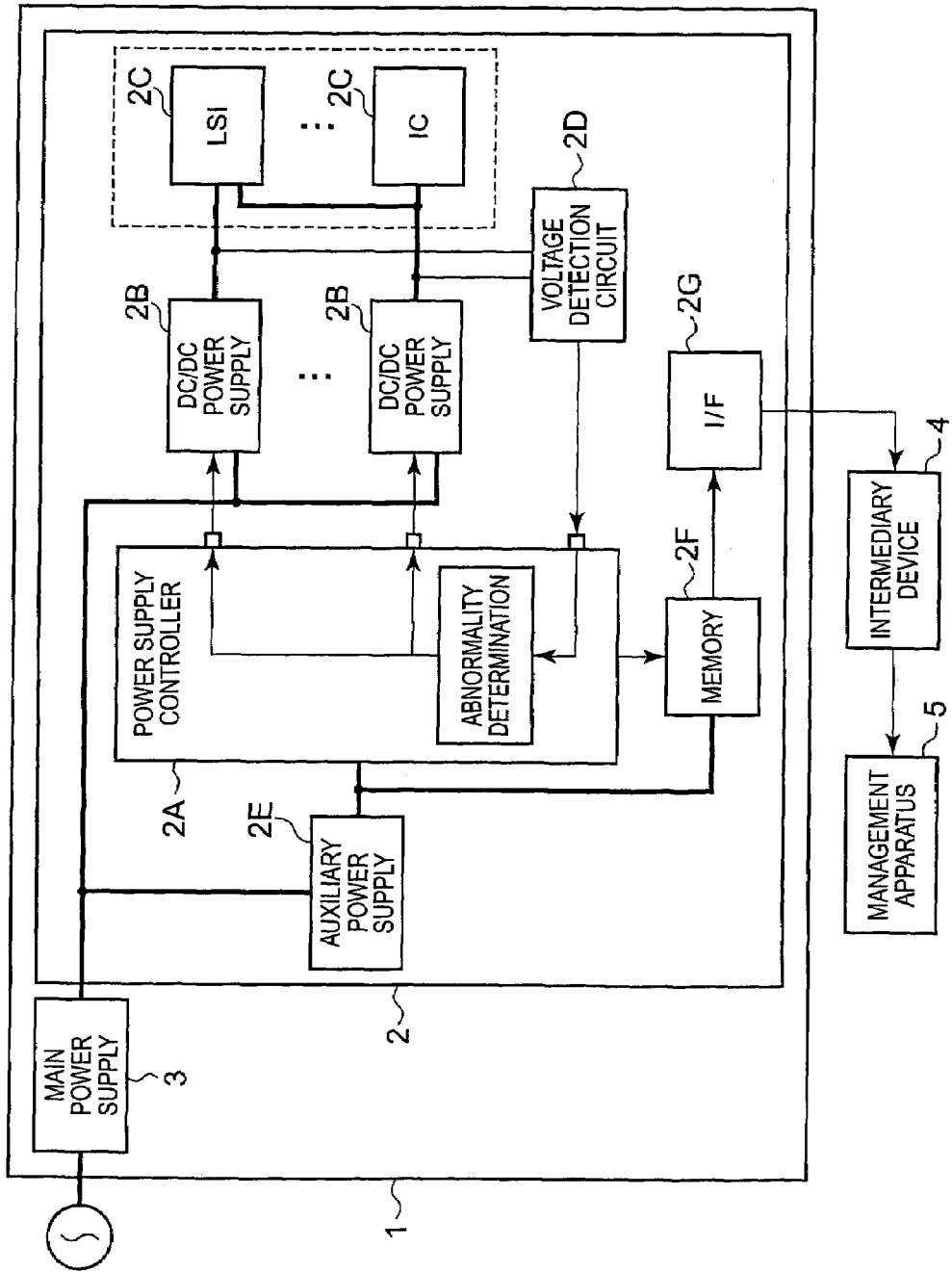
FIG. 1 is a schematic diagram showing a concept of an embodiment of the present invention.

FIG. 1 is a block diagram showing the overall concept of a storage apparatus 1 according to this embodiment. The storage apparatus 1, for example, comprises a plurality of control packages 2, and a main power supply 3 for supplying power to a control package 2. A control package 2 corresponds to a "data processing board".

A control package 2, for example, is constituted comprising a power supply controller 2A as a "power supply control part", a DC/DC power supply 2B as a "power supply part", a plurality of circuits 2C as "loads", a voltage detection circuit 2D as a "detection part", an auxiliary power supply 2E as an "auxiliary power supply part", a memory 2F as a "storage part", and an interface ("I/F" in the figure) 2G as an "interface part".

The power supply controller 2A controls the operation of the respective DC/DC power supplies 2B. The power supply controller 2A, for example, operates each DC/DC power supply 2B in a prescribed order in accordance with a prescribed start-up sequence set beforehand. Further, the power supply controller 2A immediately shuts down operation of all DC/DC power supplies 2B when an abnormality is detected in the power supply voltage outputted from any of the DC/DC power supplies 2B.

In addition, the power supply controller 2A writes information related to the abnormality of the power supply voltage to the memory 2F after shutting down the operation of all the DC/DC power supplies 2B. Then, after writing the power supply voltage abnormality-related information (power supply abnormality information) to the memory 2F, the power supply controller 2A shuts down operation of the auxiliary power supply 2E.

A DC/DC power supply 2B is controlled by the power supply controller 2A, and outputs either an alternating current or a direct current power supply voltage supplied from a main power supply 3 by converting it to a prescribed direct current power supply. The DC/DC power supplies 2B, for example, output power supply voltages of respectively different values, such as 3.3 volts or 1.5 volts. The power supply voltages outputted from the DC/DC power supplies 2B are respectively supplied to prescribed circuits 2C.

A circuit 2C, for example, is constituted as a dedicated LSI for performing data transmission, a microprocessor, or another electronic circuit. For example, a certain circuit 2C operates only on one type of power supply voltage, and another circuit 2C operates using a plurality of types of power supply voltages.

A voltage detection circuit 2D detects the respective power supply voltages outputted from the DC/DC power supplies 2B, and outputs the detected power supply voltages to the power supply controller 2A. The power supply controller 2A determines whether or not an abnormality has occurred in the power supply voltage outputted from a DC/DC power supply 2B based on a detection signal from the voltage detection circuit 2D.

The auxiliary power supply 2E is provided independently of the respective DC/DC power supplies 2B, converts power supply voltage supplied from the main power supply 3 to a prescribed direct current voltage, and supplies it to the respective information write parts of the power supply controller 2A and the memory 2F. Even when the operation of the DC/DC power supplies 2B is shut down, the power supply controller 2A can use the power supply voltage supplied from the auxiliary power supply 2E to write information related to a power supply failure to the memory 2F.

The memory 2F is a storage device for storing information related to a power supply failure, and, for example, is constituted from a nonvolatile memory, such as a flash memory, or FeRAM (Ferroelectric Random Access Memory). If it is a storage device that does not require a backup power supply, and can record additional data, it can be suitably used as the memory 2F. In the case of a nonvolatile memory, the constitution can be simplified since a backup power supply is not needed. However, the present invention is not limited to this, and, for example, the constitution can also be such that another storage device that requires a backup power supply, such as SRAM (Static Random Access Memory), is used.

The interface 2G is for outputting power supply failure information stored in the memory 2F to the outside. A management apparatus 5 is connected to this interface 2G by way of an intermediary device 4. As the intermediary device 4, for example, a separate data processing board can be used. That is, the plurality of data processing boards 2, which comprise the storage apparatus 1, are capable of reading out information related to a power supply failure from one another. Power supply failure-related information read out by a different data processing board (intermediary device 4) is transmitted to the management apparatus 5. The management apparatus 5 notifies maintenance personnel or a user about the occurrence of a power supply failure by displaying the power supply failure-related information on a screen.

As described hereinabove, when a power supply failure occurs, the operation of all the DC/DC power supplies 2B on that data processing board 2 is shut down, and thereafter, the power supply failure-related information is written to the memory 2F. The storage apparatus 1 performs shutdown processing for the data processing board 2 on which the power supply failure occurred, and creates a state, wherein this data processing board 2 will be removed from the storage apparatus 1. Furthermore, the data access processing, which was being handled by the data processing board 2, on which the power supply failure occurred, is taken over by another, normal data processing board 2.

The data processing board 2 that was removed from the storage apparatus 1 is sent to a repair center operated by the storage apparatus 1 vendor. The repair center reads out the power supply failure-related information from the memory 2F of the data processing board 2 on which the power supply failure occurred, and ascertains which DC/DC power supply 2B generated the abnormality. Further, the repair center mounts the data processing board 2 on which the power supply failure occurred into a different storage apparatus 1, and attempts to recreate the power supply failure. The data and knowledge gleaned in accordance with this kind of failure analysis work, for example, is accumulated in a failure analysis database, and used to improve the storage apparatus 1.

This embodiment, being constituted as described hereinabove, demonstrates the following effect. In this embodiment, because information related to a power supply failure is maintained on the data processing board 2, the workability of failure analysis work and maintenance work can be enhanced.

Further, in this embodiment, because information related to a power supply failure is written to the memory 2F after the operation of all the DC/DC power supplies 2B has been shut down, the efficiency of maintenance work can be improved, while preventing the malfunctioning of a circuit 2C, and maintaining reliability.

In addition, in this embodiment, because an interface 2G for reading out power supply failure-related information from the memory 2F is provided, it is possible to externally extract the power supply failure-related information via another data processing board 2 (intermediary device 4). Thus, for a storage apparatus 1 in which a power supply failure has occurred, it is possible to immediately acquire on-site information related to a power supply failure from the data processing board 2 on which the failure occurred, and for a repair center, which is physically separated from the storage apparatus 1 in which a power supply failure has occurred, it is possible to read out the information related to the power supply failure from the data processing board 2 on which this failure occurred, thereby enhancing ease-of-use in maintenance work. This embodiment will be explained in detail below.

First Embodiment

Figure 2:
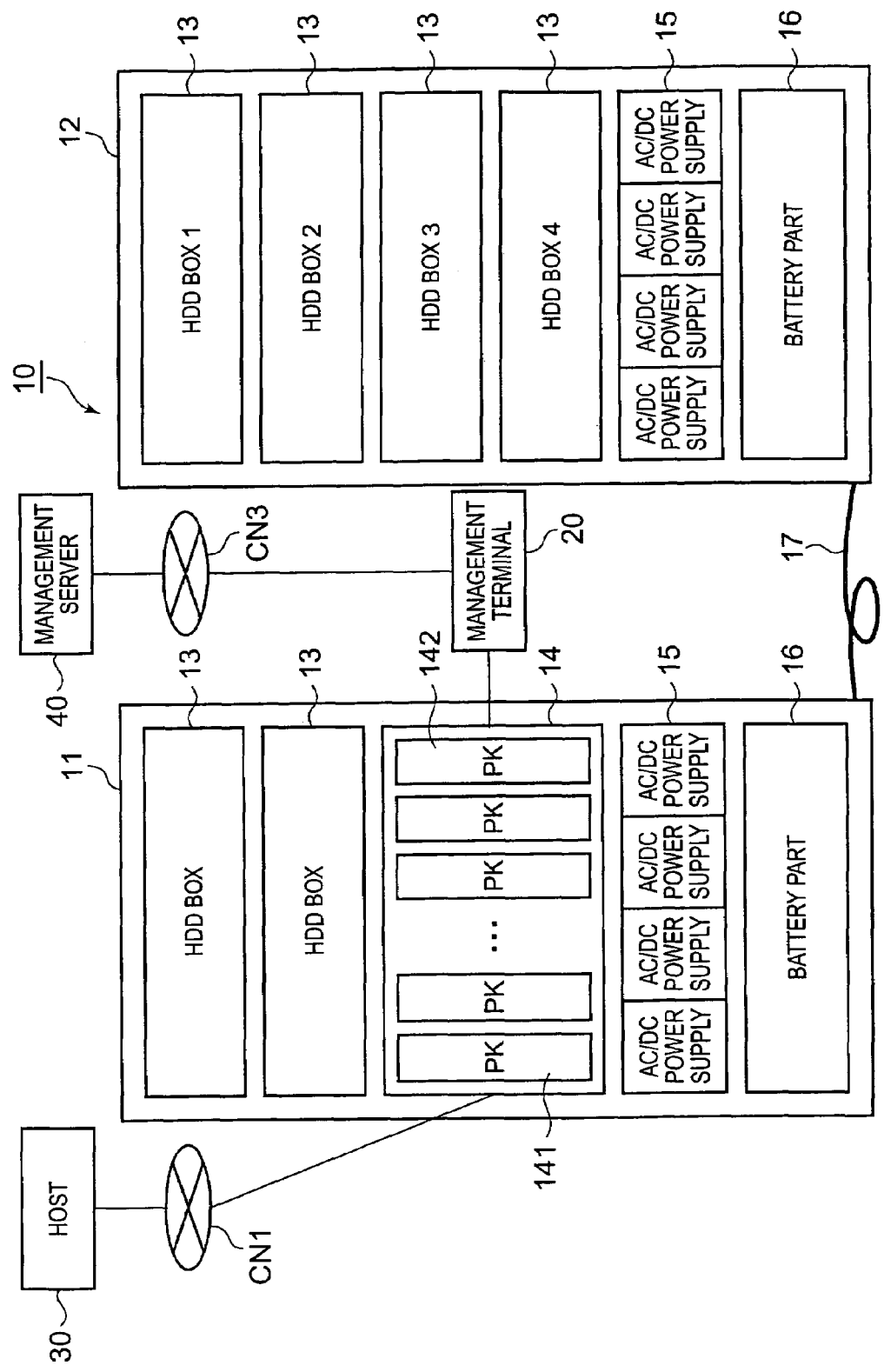
FIG. 2 is a schematic diagram showing the overall constitution of a storage system comprising a storage apparatus.

FIG. 2 is a diagram schematically showing the overall constitution of a storage system comprising a storage apparatus. This storage system, for example, can comprise a storage apparatus 10, a management terminal 20, a host 30, and a management server 40.

The details of the storage apparatus 10 will be explained hereinbelow. The management terminal 20, for example, is constituted as a computer device, such as a personal computer, or mobile information device, and, for example, is connected to the control package 142 of the storage apparatus 10 by way of a LAN or other such communication network CN2 (refer to FIG. 3). Further, the management terminal 20 can also be connected to the management server 40 via a LAN, the Internet or some other communication network CN3. The management server 40 can be connected to a plurality of management terminals 20, and, for example, can perform statistical analysis on power supply failure information collected by the respective management terminals 20.

Figure 3:
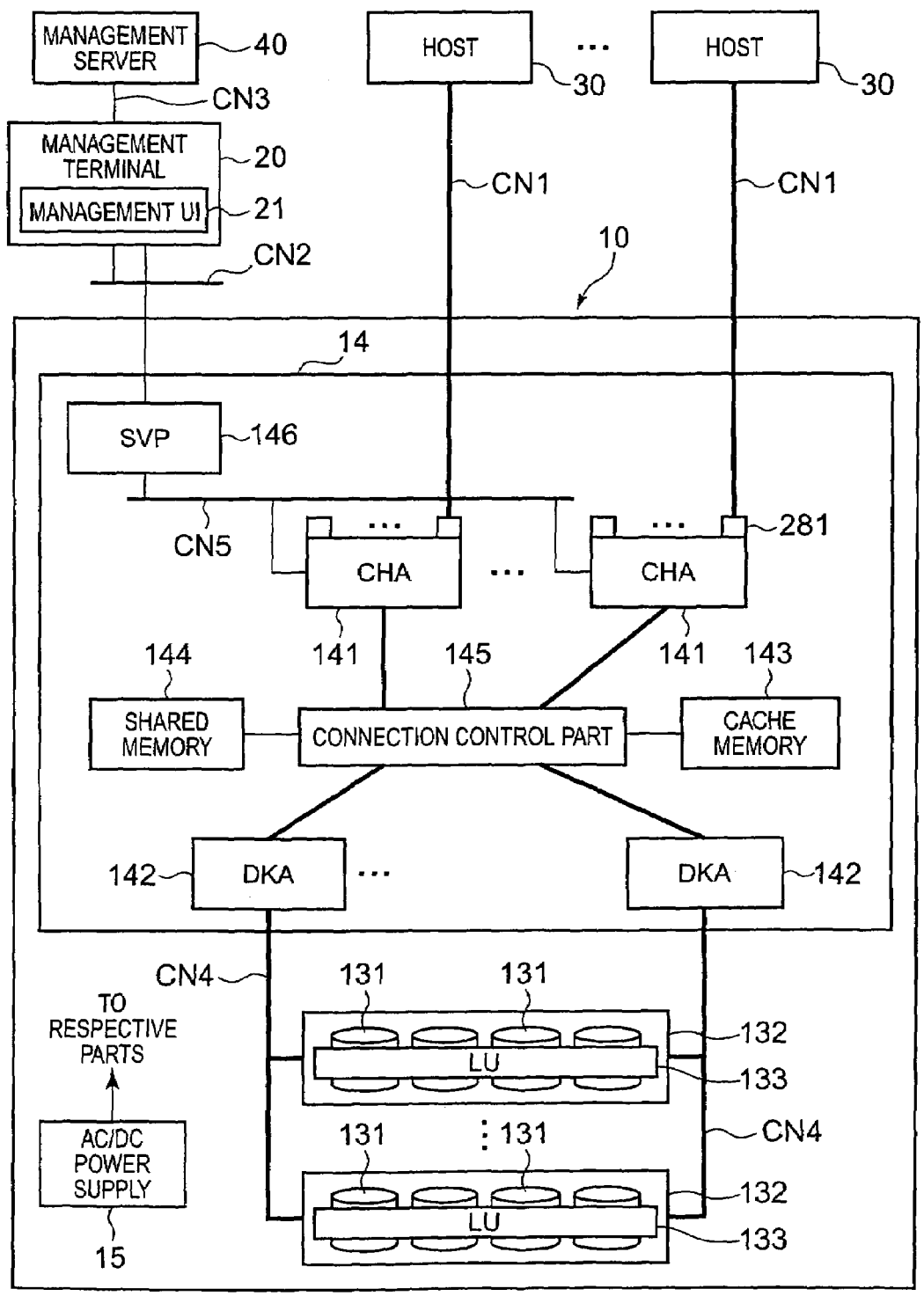
FIG. 3 is a block diagram of a storage apparatus.

A management terminal 20 comprises a user interface (abbreviated as "UI" in the figure) 21 for management use (refer to FIG. 3). The user can utilize the management user interface 21 to change the configuration of the storage apparatus 10, or to acquire various information (performance information, environment information, an so forth) from the storage apparatus 10. Further, as will be explained hereinbelow, information related to a power supply failure that occurred inside the control package 142 is displayed on the management user interface 21. Furthermore, the user interface 21 is not limited to screen outputs using text and graphics, but rather is also capable of carrying out various notifications using synthesized voice messages.

The host 30, for example, is constituted as a computer device, such as a supercomputer or mainframe machine. The host 30, for example, is connected to the control package 142 of the storage apparatus 10 via a LAN (Local Area Network), SAN (Storage Area Network) or other such communication network CN1. The host 30 reads and writes data from and to a volume 133 (refer to FIG. 3) disposed inside the storage apparatus 10.

Furthermore, an example in which the management terminal 20 manages the state of a power supply failure in the storage apparatus 10 is given, but the present invention is not limited to this, and the constitution can also be such that a storage management program is provided in the host 30, and the host 30 manages a power supply failure of the storage apparatus 10.

The constitution of the storage apparatus 10 will be explained. The storage apparatus 10, for example, is constituted comprising a main chassis 11 and an expansion chassis 12, and the main chassis 11 and expansion chassis 12 are connected by way of a SAN or other such communication channel 17. The main chassis 11 is the chassis for centralizing the basic functionality for controlling the operations of the storage apparatus 10, and the expansion chassis 12 is an optional chassis arbitrarily added in accordance with the desires of the user.

In the main chassis 11, for example, a hard disk box 13, a controller 14, an AC/DC power supply (hereinafter "main power supply") 15, and a battery part 16 are provided. In the expansion chassis 12, for example, a hard disk box 13, a main power supply 15, and a battery part 16 are provided.

The controller 14 is constituted from a plurality of control packages 141, 142. One control package 141 is a channel adapter package for controlling the exchange of data with the host 30, and the other control package 142 is a disk adapter package for controlling the exchange of data with a disk drive 131. Furthermore, besides these, a memory package and so forth can also be disposed in the controller 14.

The constitution of the storage apparatus 10 will be explained using FIG. 3. The controller 14 of the storage apparatus 10, for example, can be constituted comprising a plurality of channel adapters 141, a plurality of disk adapters 142, a cache memory 143, a shared memory 144, a connection control part 145, and a service processor 146. Furthermore, in the following explanation, a channel adapter 141 will be abbreviated as CHA 141, a disk adapter 142 will be abbreviated as DKA 142, and the service processor 146 will be abbreviated as SVP 146.

A CHA 141 controls the transfer of data between the storage apparatus 10 and a host 30, and comprises a plurality of communication ports 281. A plurality of CHA 141 can be disposed in the storage apparatus 10. A CHA 141, for example, is provided in accordance with the type of host 30, such as an open system CHA, a mainframe system CHA, and so forth. A CHA 141 receives commands requesting the reading and writing of data from the host 30, which is connected thereto, and operates in accordance with the command received from the host 30.

A plurality of DKA 142 can be disposed inside the storage apparatus 10. The respective DKA 142 control data communications with the disk drives 131. The DKA 142 carry out the transfer of data in block units to the disk drives 131 in accordance with a fibre channel protocol. The respective DKA 142 constantly monitor the status of the disk drives 131, and send the results of this monitoring to the SVP 146 via a network CN5.

Furthermore, the respective CHA 141 and DKA 142 can either be constituted as individual control circuit boards, or CHA functionality and DKA functionality can be provided on a single control circuit board.

The cache memory 143, for example, stores data written from a host 30, and data read out by a host 30. The shared memory (or control memory) 144 stores various control information, and management information for controlling the operations of the storage apparatus 10.

Furthermore, the cache memory 143 and the shared memory 144 can either be constituted as individual control circuit boards, or the cache memory 143 and the shared memory 144 can be implemented on a single memory circuit board. Further, the constitution can be such that one part of cache memory is used as a control region for storing control information, and the other part is used as a cache region for storing data.

The connection control part 145 connects with the respective CHA 141, respective DKA 142, the cache memory 143, and the shared memory 144. This makes it possible for all of the CHA 141 and DKA 142 to access the cache memory 143 and the shared memory 144. The connection control part 145, for example, is constituted as a crossbar switch.

The SVP 146 is connected to the respective CHA 141 via an internal network CN5. The SVP 146, for example, is also capable of acquiring the states of the respective DKA 142 by way of the shared memory 144 and the CHA 141. The SVP 146 acquires information related to the various states inside the storage apparatus 10, and provides this information to the management terminal 20. Further, the SVP 146 can also change the configuration of the storage apparatus 10 based on instructions from the management terminal 20

Next, the storage structure of the storage apparatus 10 will be explained. The storage apparatus 10 can comprise a plurality of disk drives 131. As a disk drive 131, for example, a hard disk drive, a semiconductor memory drive, an optical disk drive, a magneto-optical disk drive, and a magnetic tape drive can be cited. Further, when a disk drive 131 is constituted as a hard disk drive, for example, a SATA (Serial AT Attachment) disk, FC (Fibre Channel) disk or the like can be cited. Different types of hard disk drives can also be mixed together.

Either one or a plurality of logical volumes (abbreviated as "LU" in the figure) 133 can be generated using the storage region of a disk drive 131. This logical volume 133 is also called a logical storage device. For example, either one or a plurality of logical volumes 133 can be created in the storage region of a single disk drive 131. Or, the storage regions of a plurality of disk drives 131 can be grouped together, and either one or a plurality of logical volumes 133 can be provided in this group of storage regions. This kind of group 132 is also called a parity group, or a RAID group. The management terminal 20 establishes an access path between a host 30 and a logical volume 133, and provides the logical volume 133 to the host 30. The host 30 performs data read/write by accessing this logical volume 133.

Next, data input/output processing by the controller 14 will be explained initially. A CHA 141 stores a read command received from a host 30 in the shared memory 144. DKA 142 constantly reference the shared memory 144, and when one discovers an unprocessed read command, it reads the data from the disk drive 131, and stores it in the cache memory 143. The CHA 141 reads the data that has been copied to the cache memory 143, and sends it to the host 30.

When a CHA 141 receives a write command from a host 30, it stores the write command in the shared memory 144. The CHA 141 stores the received write data in the cache memory 143. After storing the write data in the cache memory 143, the CHA 141 notifies write-complete to the host 30. A DKA 142 reads out the write data stored in the cache memory 143 in accordance with the write command stored in the shared memory 144. The DKA 142 stores the write data in the disk drive 131, which constitutes the logical volume 133 specified as the write destination. Furthermore, the constitution can also be such that write-complete is notified to the host 30 after writing the write data to the disk drive 131.

An example of a control package corresponding to a "data processing board" will be explained below using a CHA 141 package as an example. The power supply failure management method of the present invention also functions effectively for other packages, such as a DKA 142.

Figure 4:
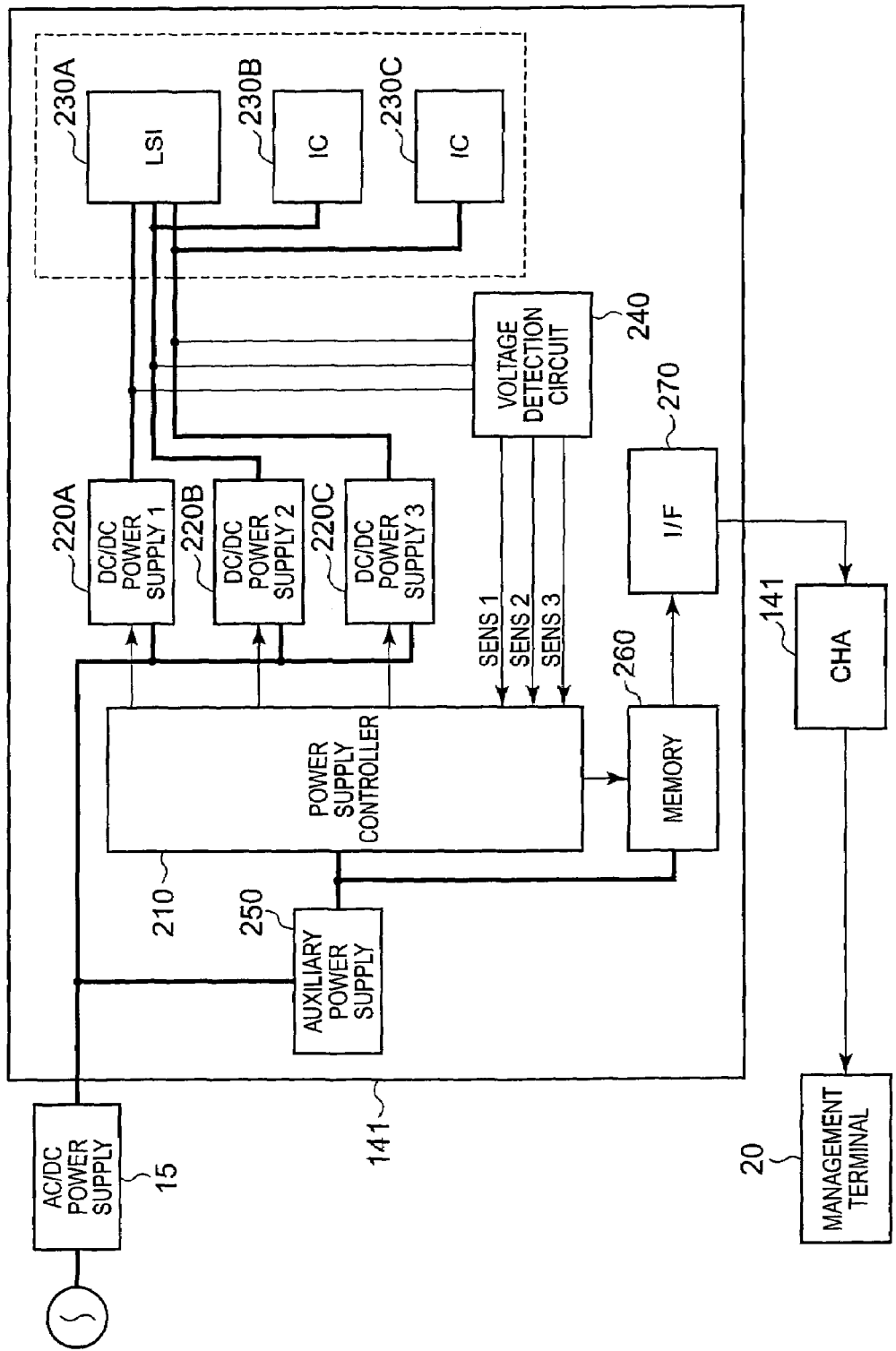
FIG. 4 is a schematic diagram showing the constitution of a CHA as a data processing board.

FIG. 4 is a circuit diagram showing a simplified constitution of a CHA 141. A CHA 141, for example, comprises a power supply controller 210, DC/DC power supplies 220A, 220B, 220C, various electronic circuits 230A, 230B, 230C, a voltage detection circuit 240, an auxiliary power supply 250, a memory 260, and an interface 270.

The power supply controller 210 controls the operation of the respective DC/DC power supplies 220A, 220B, 220C. Further, when a power supply failure occurs, the power supply controller 210 immediately shuts down the operations of the DC/DC power supplies 220A, 220B, 220C, after which it writes information related to the power supply failure (power supply failure information) to the memory 260.

The DC/DC power supplies 220A, 220B, 220C convert and output power supply voltage inputted from a main power supply 15. The DC/DC power supplies 220A, 220B, 220C supply respectively different types of power supply voltage to the circuits 230A, 230B, 230C. Furthermore, in the below explanation, when there is no particular need to distinguish between them, the DC/DC power supplies 220A, 220B, 220C will at times be abbreviated as "DC/DC power supplies 220".

The electronic circuits 230A, 230B, 230C, for example, are constituted as data transfer LSIs, microprocessors, and other such electronic circuits. In this embodiment, for the sake of expediting the explanation, it is supposed, for example, that the electronic circuit 230A manifests the functionalities of both a data transfer circuit and a microprocessor. For the embodiments explained hereinbelow, the explanation will make a distinction between a circuit, which performs data transfer, and a microprocessor. Furthermore, when there is no particular need to distinguish between the electronic circuits, they will at times be abbreviated as "electronic circuits 230".

The voltage detection circuit 240 monitors the values of the power supply voltages outputted from the DC/DC power supplies 220, and inputs detected voltage values to the power supply controller 210. In the figure, the symbols SENS1, SENS2, SENS3 are assigned to the detection signals, which are outputted from the voltage detection circuit 240 to each of the respective DC/DC power supplies 220.

The auxiliary power supply 250 is provided separately from DC/DC power supplies 220, and converts the power supply voltage inputted from the main power supply 15 to a prescribed direct current voltage, and supplies it respectively to the power supply controller 210 and the memory 260. A detailed explanation will be provided hereinbelow, but the auxiliary power supply 250 continues supplying power to the power supply controller 210 and the memory 260 for only a prescribed relatively short period of time after the operation of the DC/DC power supplies 220 have been shut down. Then, after the power supply controller 210 has written the power supply failure information to the memory 260, the operation of the auxiliary power supply 250 is shut down. This results in the entire functionality of the CHA 141 being shut down.

The memory 260, for example, is constituted as a nonvolatile memory. Power supply failure information (either the status information or status history information, which will be explained hereinbelow) is written to the memory 260 by the power supply controller 210.

The present invention is constituted such that the interface 270 is connected to the memory 260, and information stored in the memory 260 can be read outside the CHA 141 via this interface 270. For example, a separate CHA 141 is connected to the interface 270 by way of the connection control part 145 in FIG. 3. This separate CHA 141 is connected to the management terminal 20 via the SVP 146. This makes it possible for the management terminal 20 to read out, via the SVP 146 or the like, the power supply failure information stored inside the memory 260, and notify a user or maintenance personnel of the occurrence of a failure.

Figure 5:
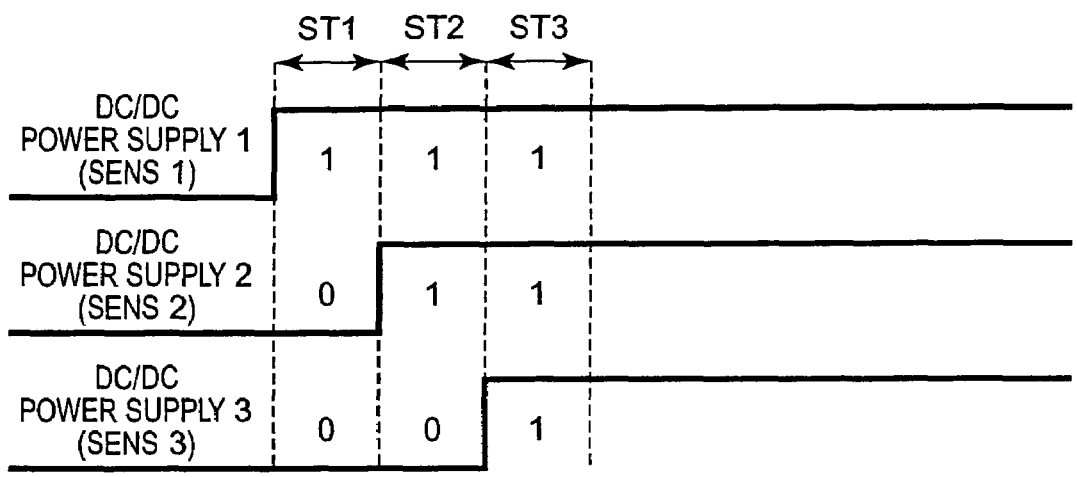
FIG. 5 is a schematic diagram showing the normal start-up sequence of a DC/DC power supply.

Next, a method for determining whether the respective DC/DC power supplies 220 are in a normal state or an abnormal state will be explained. FIG. 5 is a schematic diagram showing the start-up sequence when operating the DC/DC power supplies 220.

"ST" in the figure signifies the status period. As one example, in a normal start-up sequence, initially, a first DC/DC power supply 220A is operated during a first period ST1, next, a second DC/DC power supply 220B is operated during a second period ST2, and finally, a third DC/DC power supply 220C is operated during a third period ST3. A circuit 230 starts up normally by virtue of the power supply controller 210 operating the respective DC/DC power supplies 220 in a prescribed order (first DC/DC power supply→second DC/DC power supply→third DC/DC power supply).

When the first DC/DC power supply 220A commences operation, the voltage detection circuit 240 detects the output voltage of the first DC/DC power supply 220A, and outputs a detection signal (SENS1) to the power supply controller 210. By so doing, the power supply controller 210 confirms that the first DC/DC power supply 220A started up normally. When the first DC/DC power supply 220A starts up normally, its status changes from "0" to "1". Status "0" indicates the shutdown state, and status "1" indicates the operating state.

Similarly, when the second DC/DC power supply 220B and the third-DC/DC power supply 220C commence operation thereafter, their statuses change from "0" to "1". As explained hereinabove, the power supply controller 210 operates the respective. DC/DC power supplies 220A, 220B, 220C in a prescribed order.

Therefore, in the initial first period ST1, only the status of the first DC/DC power supply 220A becomes "1", and the statuses of the second DC/DC power supply 220B and the third DC/DC power supply 220C are both "0". In the subsequent second period ST2, the statuses of the first DC/DC power supply 220A and the second DC/DC power supply 220B are "1", and only the status of the third DC/DC power supply 220C is "0". In the final third period ST3, the statuses of all of the DC/DC power supplies 220A, 220B, 220C become "1".

Figure 6:
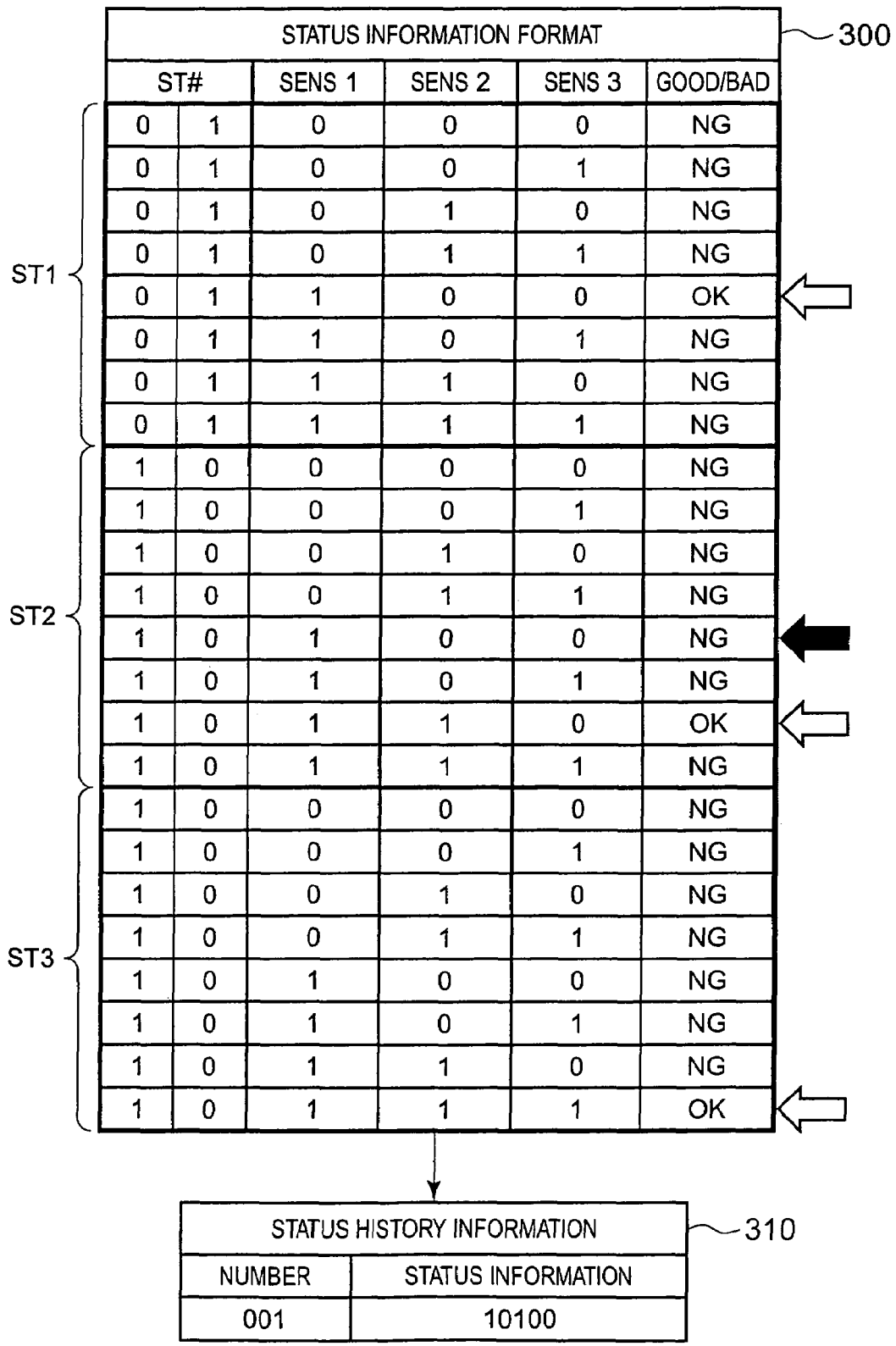
FIG. 6 is a schematic diagram showing a status information format.

FIG. 6 is a schematic diagram showing an example of a status information format 300. By referencing this format 300, it is possible to easily determine whether or not the respective DC/DC power supplies 220 are operating normally.

In the first period ST1, a normal state (OK) is only indicated when the status of the first DC/DC power supply 220A alone becomes "1", and the statuses of the second DC/DC power supply 220B and the third DC/DC power supply 220C are both "0". In all cases other than this, an abnormal state (NG) is indicated. The combinations of statuses for a normal state are indicated by the white arrows.

Similarly, in the second period ST2, a normal state is only indicated when the statuses of the first DC/DC power supply 220A and the second DC/DC power supply 220B are "1", and only the status of the third DC/DC power supply 220C is "0". In all other cases, an abnormal state is indicated.

Similarly, in the third period ST3, a normal state is only indicated when the statuses of all the DC/DC power supplies 220A, 220B, 220C become "1". In all other cases, an abnormal state is indicated.

As shown at the bottom of FIG. 6, the power supply controller 210, under prescribed circumstances, creates status history information 310, and stores this status history information 310 in the memory 260. A prescribed circumstance, for example, is when an abnormality is detected in any one of the DC/DC power supplies 220, but the power supply controller 210 can create status history information 310 under circumstances other than this as well.

Status history information 310 is information related to power supply failures, and, for example, is constituted by making numbers in sequence correspond to status information. Numbers in sequence are numbers for identifying respective status history information 310, and, for example, are allotted three bits. Status information is information showing the combinations of statuses of the respective DC/DC power supplies 220 for a certain time period ST, and, for example, is allotted five bits.

The first two bits of status information are used to distinguish a time period ST. The first period ST1 is "01", the second period ST2 is "10", and the third period ST3 is "11". The remaining three bits of the status information indicate the status combination. These three bits show the statuses of the respective DC/DC power supplies 220. The first bit indicates the status of the first DC/DC power supply 220A, the next bit indicates the status of the second DC/DC power supply 220B, and the last bit indicates the status of the third DC/DC power supply 220C. For example, "000" indicates that all of the DC/DC power supplies 220 are shut down, and "111" indicates that all of the DC/DC power supplies 220 are operating. Further, "100" indicates that only the first DC/DC power supply 220 is operating. In other words, a determination can be made as to which DC/DC power supply 220 incurred an abnormality by virtue of the two bits that distinguish the time period, and the three bits that indicate the status combination. Thus, status history information 310 can be constituted as a total of eight bits of data.

Furthermore, the constitution of the status history information 310 shown in FIG. 6 is an example, and the present invention is not limited to this. For example, as will become clear from the embodiments that will be explained hereinbelow, status history information 310 can also comprise information related to changes in the configuration of the storage apparatus 10, and time information. Further, identification information for specifying a CHA 141 can also be included to show the CHA 141 to which the information is related. In addition, status history information 310 can also comprise the device number of the storage apparatus 10 to show in which storage apparatus 10 the information is being used.

Figure 7:
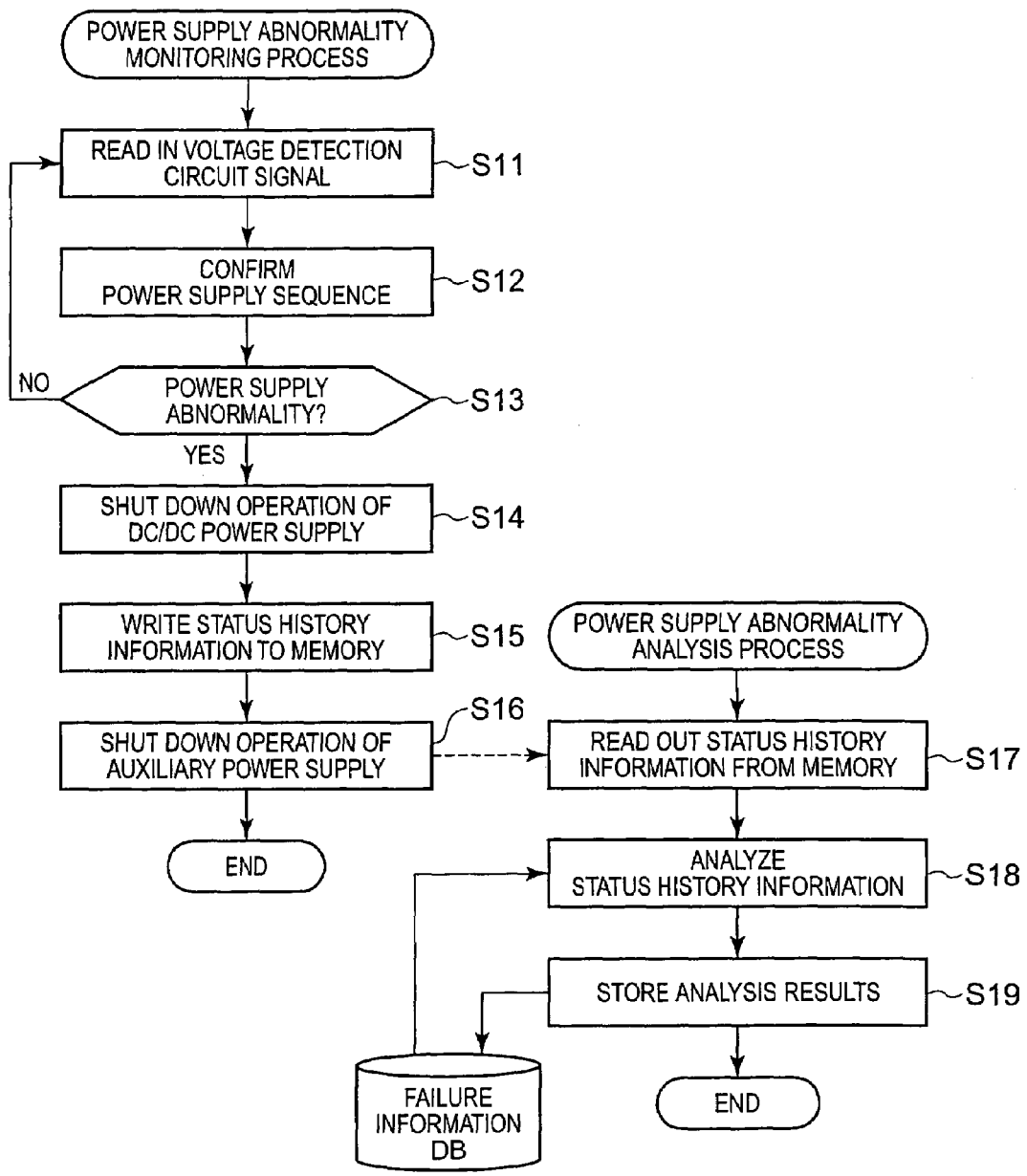
FIG. 7 is a flowchart showing a power supply abnormality monitoring process and a power supply abnormality analyzing process.

FIG. 7 is a flowchart showing the process for monitoring a power supply abnormality (power supply failure), and the process for analyzing a power supply abnormality. Furthermore, the same holds true for each of the flowcharts hereinbelow, but each flowchart shows an overview of a process within the scope required to understand and implement the present invention, and there will be times when these flowcharts differ with an actual program.

First, as shown on the left side of FIG. 7, the power supply controller 210 reads in various signals (SENS1 through SENS3) from the voltage detection circuit 240 (S11), confirms the normal power supply sequence shown in FIG. 5 (S12), and determines whether or not a power supply abnormality exists (S13).

When a power supply abnormality has occurred (S13: YES), the power-supply controller 210 immediately shuts down the operation of all the DC/DC power supplies 220 (S14). This also shuts down the respective electronic circuits 230. However, only the power supply controller 210 and the memory 260 are backed up by the auxiliary power supply 250.

After shutting down only the main data processing functions of the CHA 141 (the functionality realized by the electronic circuits 230), the power supply controller 210 creates status history information 310 based on the statuses of the respective DC/DC power supplies 220 when a power supply abnormality is detected, and stores this prepared status history information-310 in the memory 260 (S15). Furthermore, in this embodiment, status history information 310 is only prepared when a power supply abnormality is detected, and instead of being designated status history information, it could also be called status management information.

The power supply controller 210 shuts down the operation of the auxiliary power supply 250 after writing the status history information 310 to the memory 260 (S16). This shuts down the functions of the CHA 141 in which the failure was detected.

The management terminal-20 can access the memory 260 of the CHA 141 in which the power supply failure (power supply abnormality) was detected via another, normal CHA 141, and can read out the status history information 310 (S17). Then, the user or maintenance personnel can analyze the contents of the status history information 310 by displaying the status history information 310 read out from the memory 260 on the display of the management terminal 20 (S18). The results of this analysis, for example, are stored in a failure information database managed in a consolidated condition by the management server 40 (S19).

Furthermore, in the above explanation, a power supply failure was analyzed at the location where the storage apparatus 10 is installed, but the present invention is not limited to this, and, for example, failure analysis can also be performed by reading out the status history information 310 from the memory 260 of the CHA 141 at a repair facility or laboratory.

Because this embodiment is constituted as described hereinabove, it demonstrates the following effect. In this embodiment, since information related to a power supply failure (status history information 310) is stored inside the package of a CHA 141, the workability of failure analysis work and maintenance work can be enhanced.

In this embodiment, the constitution is such that only the part related to the generation and storage of status history information 310 is partially backed up by the auxiliary power supply 250. This makes it possible to write status history information 310 into the memory 260 after shutting down the operation of all the DC/DC power supplies 220. Therefore, it is possible to prevent a malfunction of an electronic circuit 230 and maintain reliability, and the workability of maintenance work can be enhanced.

In other words, in this embodiment, when a power abnormality occurs, principal functionality (data processing function, data transmission function) that could be directly impacted by this power supply abnormality is immediately shut down, and only the functionality for storing information related to the power supply abnormality is backed up. This makes it possible to prevent the occurrence of malfunctions related to either data processing or data transmission when a power supply abnormality occurs, while storing information related to the power supply abnormality, and being useful in the notification and analytical processing of a failure.

In this embodiment, since an interface 270 for reading out status history information 310 from the memory 260 is provided, the management terminal 20 can acquire status history information 310 via another CHA 141. This makes it possible to immediately acquire onsite information related to a power supply failure from the CHA 141 in which the failure occurred, and to some extent carry out an investigation in the storage apparatus 10 in which the power supply failure occurred. Further, it enables status history information 310 to be read out from the memory 260 of a CHA 141 in which this power supply failure occurred at a repair center as well, thereby enhancing ease-of-use in maintenance work.

Second Embodiment

A second embodiment of the present invention will be explained on the basis of FIG. 8 through FIG. 11. The following embodiments, to include this embodiment, correspond to variations of the first embodiment. In the following explanation, the focus of the explanation will be on the points of difference with the first embodiment. In this embodiment, a CHA 141, which is one example of a data processing board, is constituted in two tiers from a plurality of boards 201, 202, and information related to a power supply failure detected in a plurality of boards 202 is stored in shared memory 261.

FIG. 8 is a diagram schematically showing the board constitution of a CHA 141. As shown in the oblique view of FIG. 8(a), this CHA 141, for example, is constituted from a base board 201, and a plurality of MP boards 202, which are mounted on one side of the base board 201. The base board 201 corresponds to the "first board", and the MP boards 202 correspond to the "second boards". As also shown in the plan view of FIG. 8(b), for example, four MP boards ("MP-PCB" in the figure) 202 are disposed on the base board ("Base PCB" in the figure) 201, and both boards 201, 202 are connected by a connector or the like.

Figure 9:
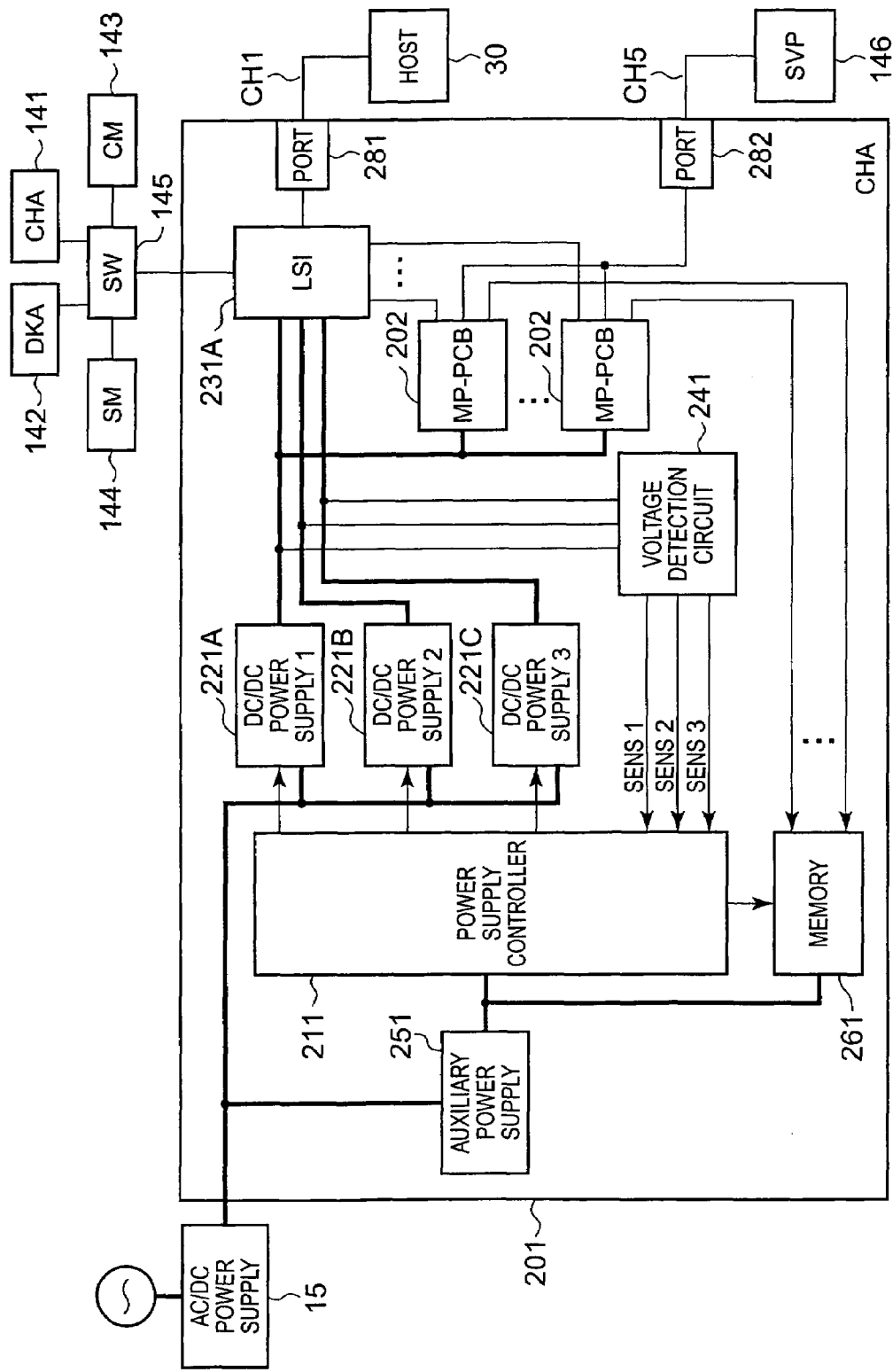
FIG. 9 is a block diagram, which focuses on the constitution of a base board.

FIG. 9 is a circuit diagram showing the circuit constitution of the base board 201. A variety of circuits that can be used in common by the MP boards 202 are mounted to the base board 201. The base board 201, for example, is constituted comprising a power supply controller 211, a plurality of DC/DC power supplies 221A, 221B, 221C, a data transfer circuit 231A, a voltage detection circuit 241, an auxiliary power supply 251, a memory 261, a communication port 281 for connecting to a host 30, and a port 282 for connecting to the SVP 146. Furthermore, when it is not particularly necessary to distinguish between the DC/DC power supplies 221A, 221B, 221C, they will be abbreviated as DC/DC power supplies 221.

The power supply controller 211, DC/DC power supplies 221, voltage detection circuit 241, auxiliary power supply 251, and memory 261 demonstrate the same functionality as the above-mentioned power supply controller 210, DC/DC power supplies 220, voltage detection circuit 240, auxiliary power supply 250, and memory 260. Consequently, a detailed explanation of these will be omitted.

The data transfer circuit 231A is a circuit for storing data received from a host 30 in the cache memory 143, and for transferring the data stored in the cache memory 143 to the host 30.

A first DC/DC power supply 221A of the plurality of DC/DC power supplies 221 supplies power to the respective MP boards 202 on the base board 201. The MP boards 202 are connected to the memory 261, data transfer circuit 231A and port 282 on the base board 201.

Figure 10:
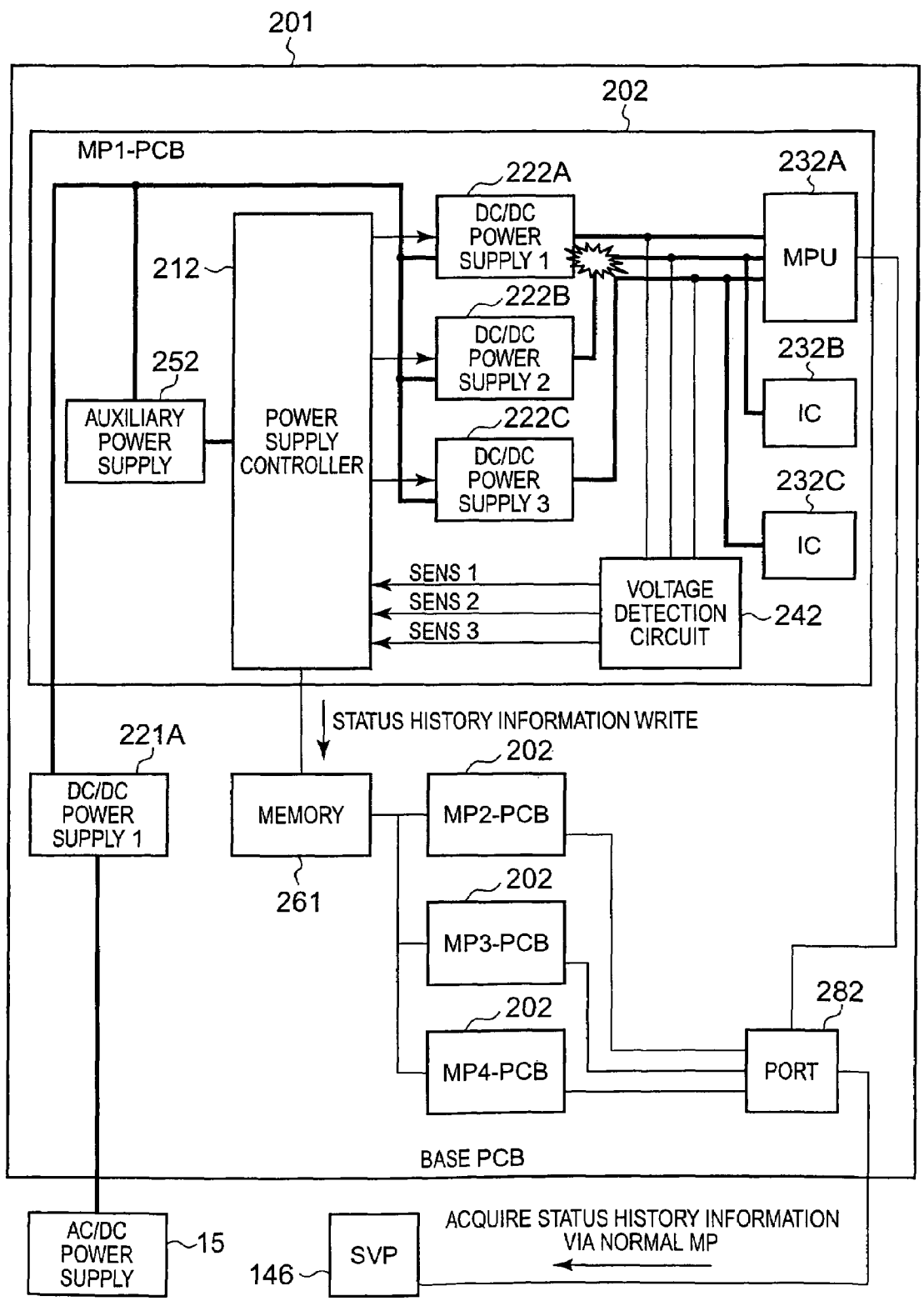
FIG. 10 is a block diagram, which focuses on the constitution of a single MP board.

FIG. 10 is a circuit diagram that focuses on the constitution of a single MP board 202. In FIG. 10, the constitution of the base board 201 is shown in a simplified condition to save on paper. As shown in the upper portion of FIG. 10, a MP board 201, for example, is constituted comprising a power supply controller 212, a plurality of DC/DC power supplies 222A, 222B, 222C, a plurality of electronic circuits 232A, 232B, 232C, a voltage detection circuit 242, and an auxiliary power supply 252. The electronic circuit 231A is a microprocessor for controlling the operation of the CHA 141.

As can be seen by comparing the constitution of the base board 201 and the constitution of the MP board 202, the memory 261 is only disposed on the base board 201. That is, in this embodiment, the constitution is such that the occurrence of a power supply failure is monitored in the base board 201 and MP boards 202, respectively, and status history information prepared by the respective boards 201, 202, is respectively stored in the common memory 261 disposed on the base board 201.

As shown in FIG. 10, if an abnormality is detected in the voltage output of a second DC/DC power supply 222B of the first MP board 202, the power controller 212 of the MP board 202 shuts down the operation of all the DC/DC power supplies 222A through 222C. Thereafter, the power supply controller 212 prepares status history information 310, and stores this status history information in the memory 261 on the base board 201.

The user and maintenance personnel will access any of the normally operating microprocessors 232A from the management terminal 20 via the SVP 146, and read out status history information 310 from the memory 261 via this microprocessor 232A.

Figure 11:
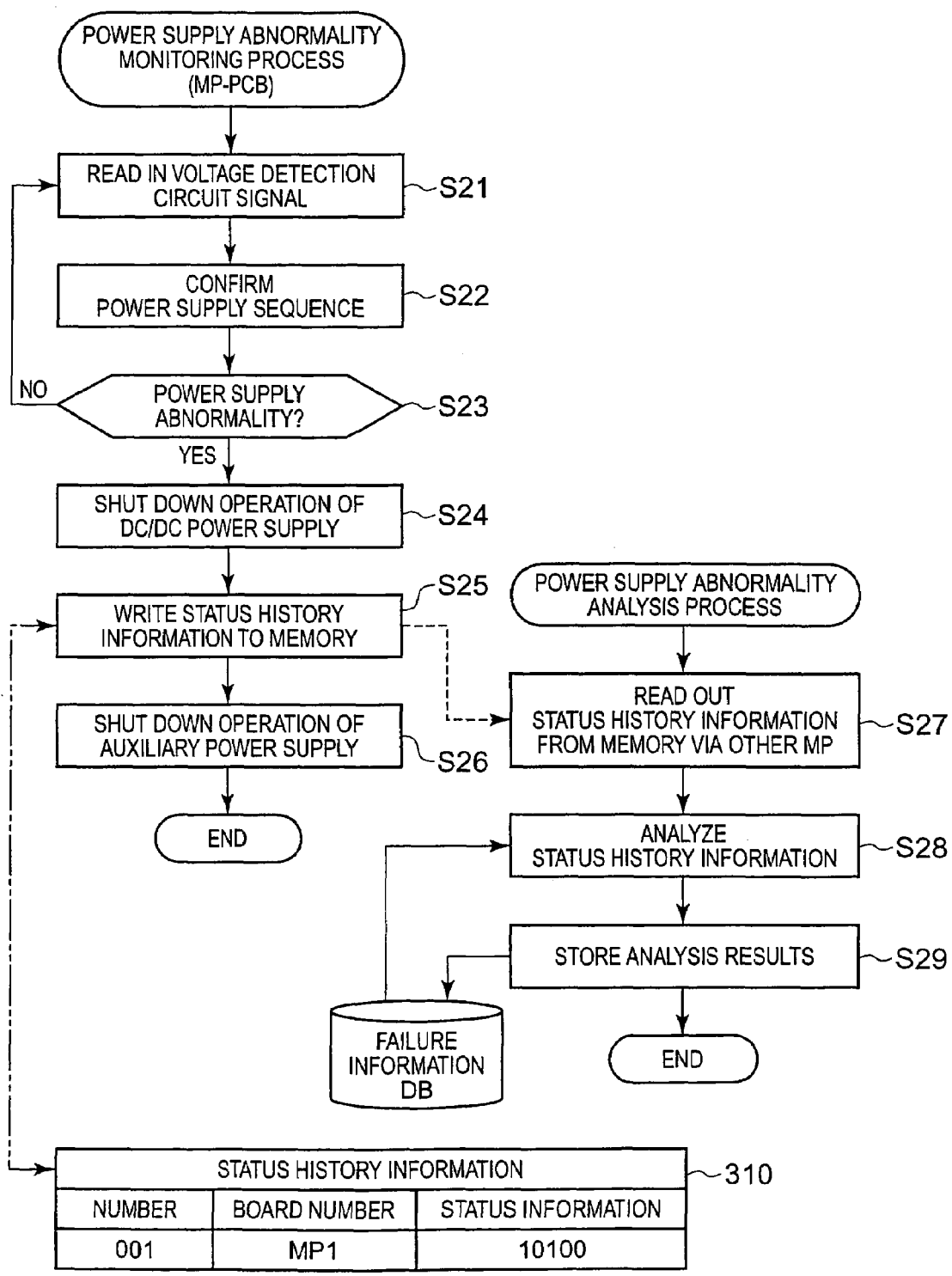
FIG. 11 is a flowchart showing a power supply abnormality monitoring process.

FIG. 11 is a flowchart showing a power supply abnormality management process and power supply abnormality analysis process in accordance with this embodiment. A power supply abnormality (power supply failure) can occur in any of the base board 201 and MP boards 202, but an example will be explained here in which a power supply failure occurs in an MP board 202. Furthermore, an example of when a power supply failure occurs in the base board 201 will be explained in a different embodiment.

The power supply controller 212 of the MP board 202 reads out the detection signal from the voltage detection circuit 242 (S21), compares this signal against a normal power supply sequence (S22), and makes a determination as to whether or not a power supply abnormality has occurred (S23).

When it is determine that a power supply abnormality has occurred (S23: YES), the power supply controller 212 immediately shuts down the operation of all the DC/DC power supplies 222 (S24). The power supply controller 212 prepares status history information 310 related to the DC/DC power supply 222 in which the power supply abnormality was detected, and stores this status history information 310 in the memory 261 on the base board 201 (S25). Then, the power supply controller 212 shuts down the operation of the auxiliary power supply 252, and ends this process (S26).

Here, in this embodiment, status history information 310 prepared by respectively different power supply controllers 211, 212 is stored in a common memory 261. Therefore, identification information for showing by which power supply controller 211, 212 the information was prepared can be added to the status history information 310. As an example of this identification information, the "board number" in FIG. 11 can be cited. The constitution can also be such that information showing by which power supply controller 211, 212 the information was prepared can be included inside the "sequence number" instead of this. Or, the constitution can also be such that the storage region of the memory 261 can be divided beforehand, and the storage regions that the respective power supply controllers 211, 212 utilize can be determined in advance.

The user and maintenance personnel can read out status history information 310 inside the memory 261 via a microprocessor 232A on another, normal MP board 202 disposed inside a CHA 141 in which a power supply abnormality was detected. The read-out status history information 310 is transferred to the management terminal 20 from the SVP 146. Thereafter, the user et al analyze the status history information 310 (S28), and store the results of analysis in a failure information database (S29) the same as in the first embodiment.

This embodiment, which is constituted as described hereinabove, also demonstrates the same effect as the above-mentioned first embodiment. In addition to this, in this embodiment, when the base board 201 and plurality of MP boards 202 are a two-tiered constitution, and constitute a CHA 141, since the memory 261 is only disposed on the base board 201, it is possible to simplify the constitution. That is, the power supply controller 211 of the base board 201, and the power supply controller 212 of the respective MP boards 202 can respectively store the status history information 310 in the common memory 261. Then, status history information 310 stored in the memory 261 can be read out by way of a normally operating microprocessor 232A.

Third Embodiment

A third embodiment will be explained based on FIG. 12, FIG. 13, and FIG. 14. In this embodiment, a plurality of CHA 141 constitute a cluster, and when a power supply abnormality is detected in the base board 201 of any one of the CHA 141, the occurrence of the power supply abnormality is notified to a host 30 by way of another cluster of CHA 141.

Figure 12:
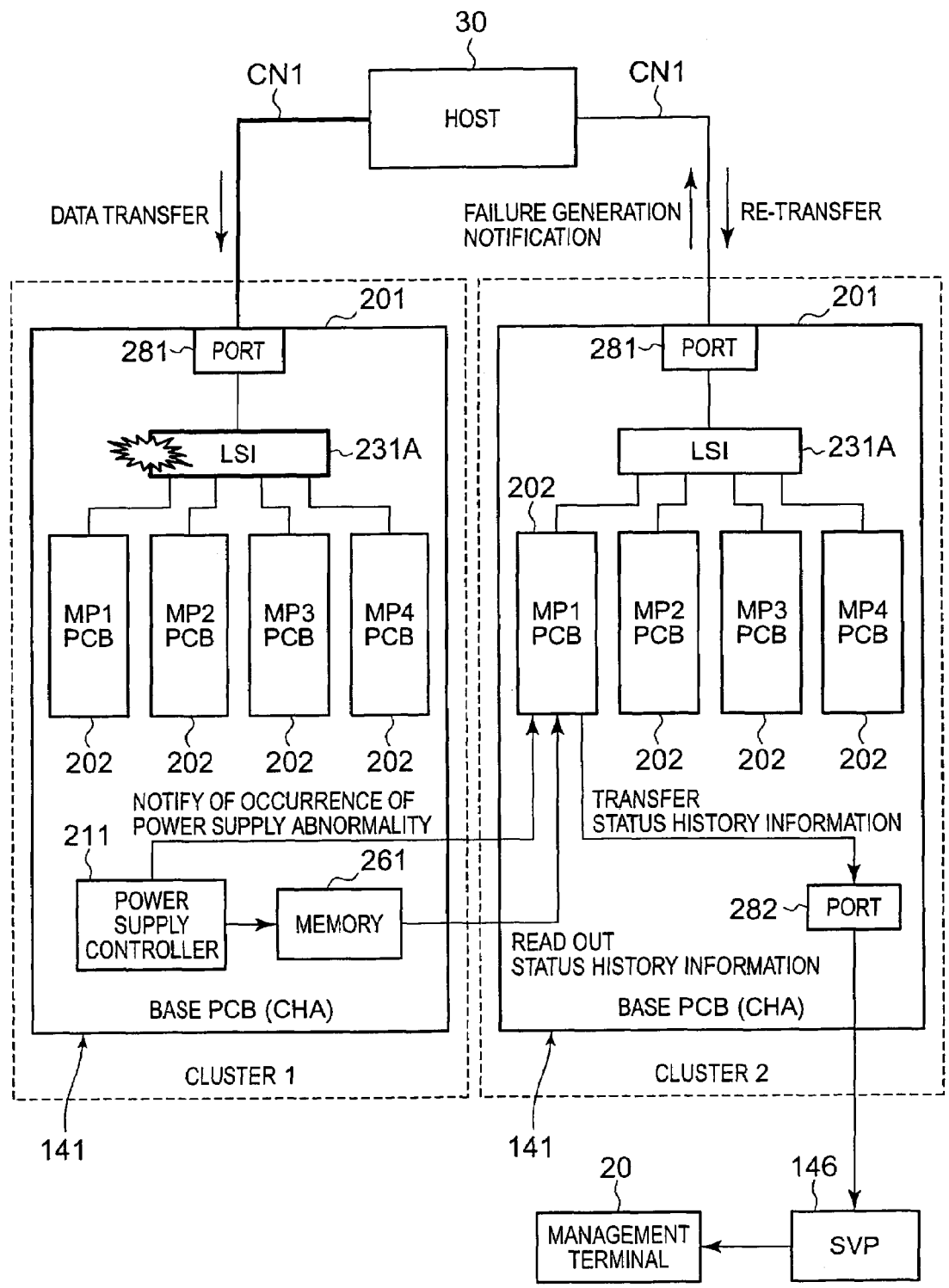
FIG. 12 is a diagram schematically showing the principal parts of a storage apparatus related to a third embodiment.

FIG. 12 is a diagram schematically showing the main constitution of a storage apparatus 10 of this embodiment. In this embodiment, two CHA 141 constitute a cluster. As shown in the left side of FIG. 12, when a power supply abnormality occurs in the base board 201 of the CHA 141 on the one side, the power supply controller 211 of the base board 201 shuts down the operation of all the DC/DC power supplies 221. This shuts down the functionality of the data transfer circuit 231A. The power supply controller 211 notifies the CHA 141 of the other system (the partner CHA 141 comprising the cluster, which is the CHA shown in the right side of FIG. 12) of the occurrence of the power supply abnormality. Also, the power supply controller 211 stores the status history information 310 in the memory 261.

When a power supply abnormality occurs in the base board 201, since the functionality of the base board 201 is shut down, the functionality of this CHA 141 is also shut down. Therefore, the host 30 is not able to access data using the CHA 141 in which this power failure occurred.

Accordingly, the other CHA 141 constituting the cluster, notifies the host 30 of the occurrence of a power supply failure on the basis of a notification from the power supply controller 211 of the one CHA 141. This enables the host 30 to carry out a data access to a volume 133 using a normally operating CHA 141.

Status history information 310 stored in the memory 261 can be read out by using a microprocessor 232A of any other CHA 141.

Figure 13:
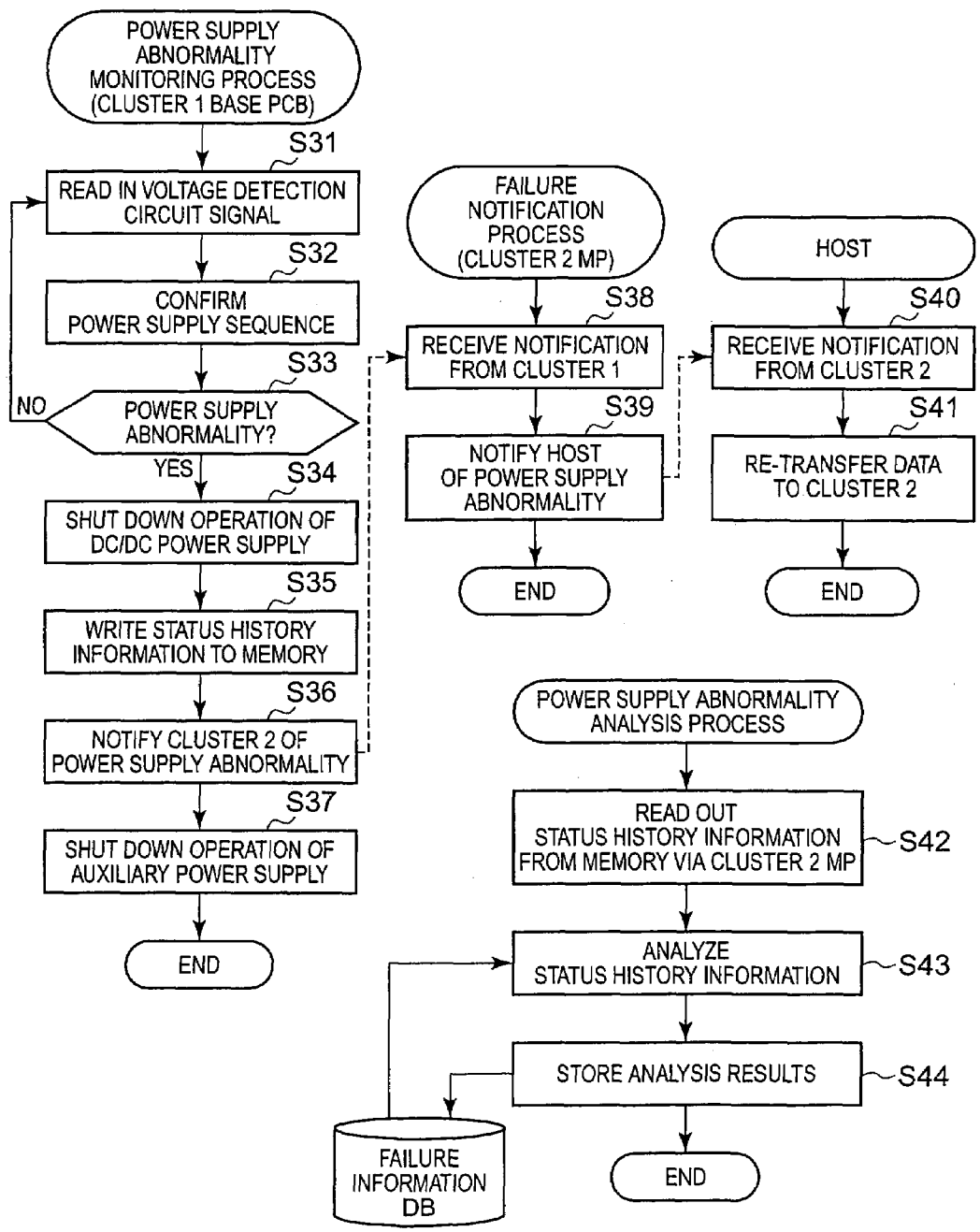
FIG. 13 is a flowchart showing a power supply abnormality monitoring process.

FIG. 13 is a flowchart showing a power supply abnormality monitoring process in accordance with this embodiment. In the following explanation, an example in which a power supply failure occurs in the cluster 1 that the host 30 is using will be explained.

First, the power supply controller 211 mounted in the CHA 141 of cluster 1 reads out a detection signal from the voltage detection circuit 241 (S31), and, by comparing this detection signal to a normal power supply sequence (S32), makes a determination as to whether or not a power supply abnormality has occurred (S33).

When it is determine that a power supply abnormality has occurred (S33: YES), the power supply controller 211 of cluster 1 immediately shuts down the operation of all the DC/DC power supplies 221 under its management (S34), and stores status history information 310 in the memory 261 (S35). Then, after notifying the cluster 2 CHA 141 to the effect that a power supply abnormality has occurred (S36), the cluster 1 power supply controller 211 shuts down the operation of the auxiliary power supply 251 (S37).

When any of the microprocessors 232A mounted on the CHA 141 of cluster 2 receives a notification from the cluster 1 power supply controller 211 advising of the occurrence of a failure (S38), it notifies the host 30 to the effect that a power supply failure has occurred (S39).

When the host 30 receives a notification from the cluster 2 CHA 141 (S40), it switches the access path to the storage apparatus 10 from cluster 1 to cluster 2, and transfers write data once again (S41). Furthermore, an example in which the host 30 accesses write data will be explained, but the same holds true for a read access. When a failure occurs in cluster 1, the host 30 reads out the desired data using the CHA 141 of cluster 2.

Meanwhile, when an analysis of a power supply abnormality is performed, the user or maintenance personnel access any of the microprocessors 232A of cluster 2 from the management terminal 20 via the SVP 146, and read out the status history information 310 inside the memory 261 by way of this microprocessor 232A (S42). Then, the user et al analyze the status history information 310 of cluster 1 (S43), and store the results of this analysis in the failure information database (S44).

Figure 14:
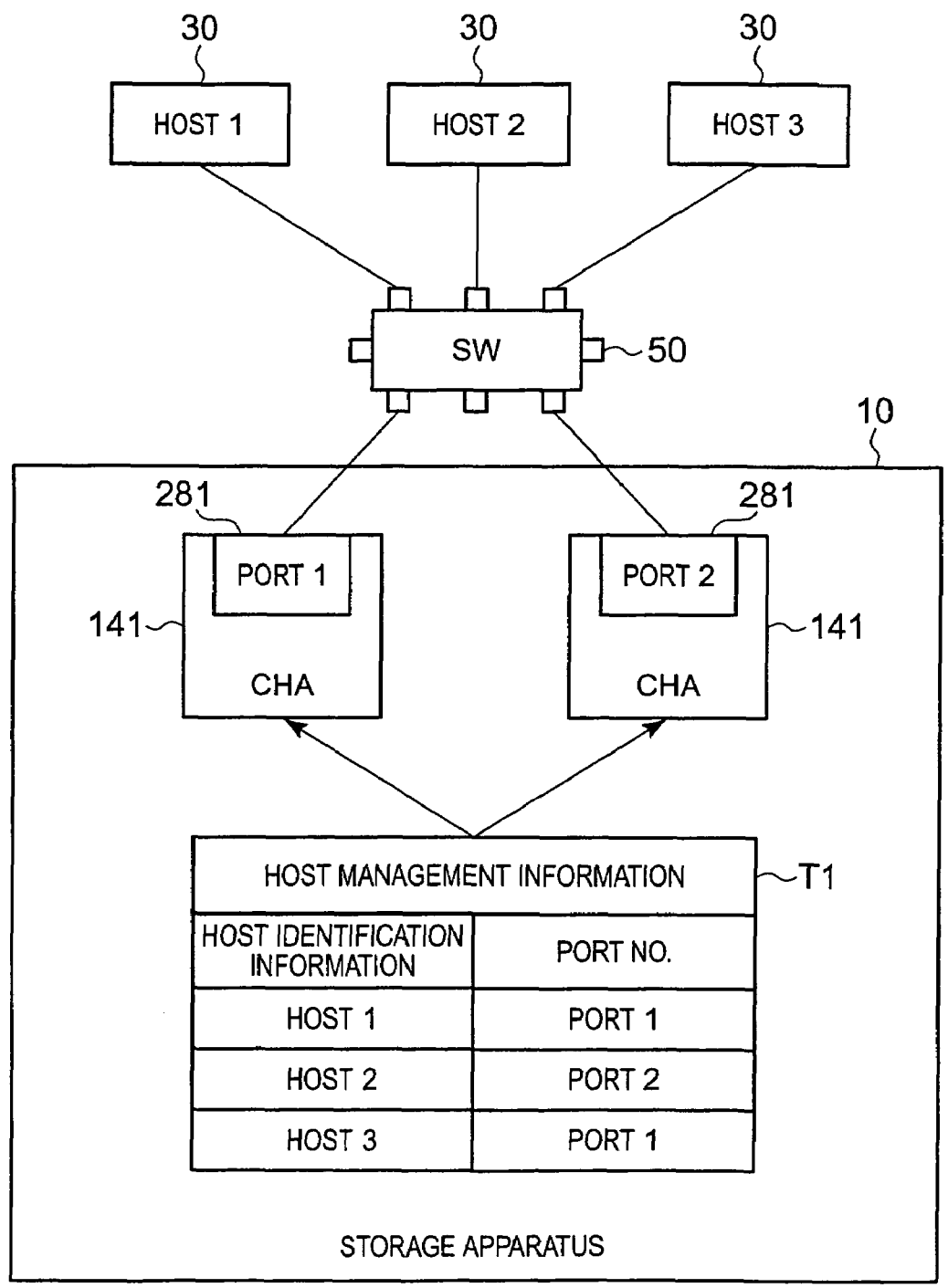
FIG. 14 is a schematic diagram showing a method for managing the corresponding relationship between a host and a port.

FIG. 14 is a schematic diagram showing which host 30 determines if the occurrence of a power supply failure should be notified when a plurality of hosts 30 is connected to the storage apparatus 10. For example, host management information T1 is stored in the shared memory 144 of the storage apparatus 10.

Host management information T1, for example, is managed by corresponding host identification information for identifying the respective hosts 30 to port identification information for identifying the ports used by these hosts 30. As identification information, for example, an IP (Internet Protocol) address, WWN (World Wide Name) or the like can be utilized. Referencing host management information T1 like this makes it possible to determine whether the CHA 141 of cluster 2 should notify one of the hosts 30 that a power failure has occurred.

This embodiment, which is constituted as described hereinabove, also demonstrates the same effect as the above-mentioned first embodiment. In addition to this, in this embodiment, when it is a cluster constitution, a power supply failure that occurs in the one cluster is notified to the host 30 from the other cluster. Therefore, a host 30 can carry out a data access by switching to a normal cluster without having to wait for the detection of a timeout error, thereby enhancing the ease-of-use of the user.

Fourth Embodiment

Figure 15:
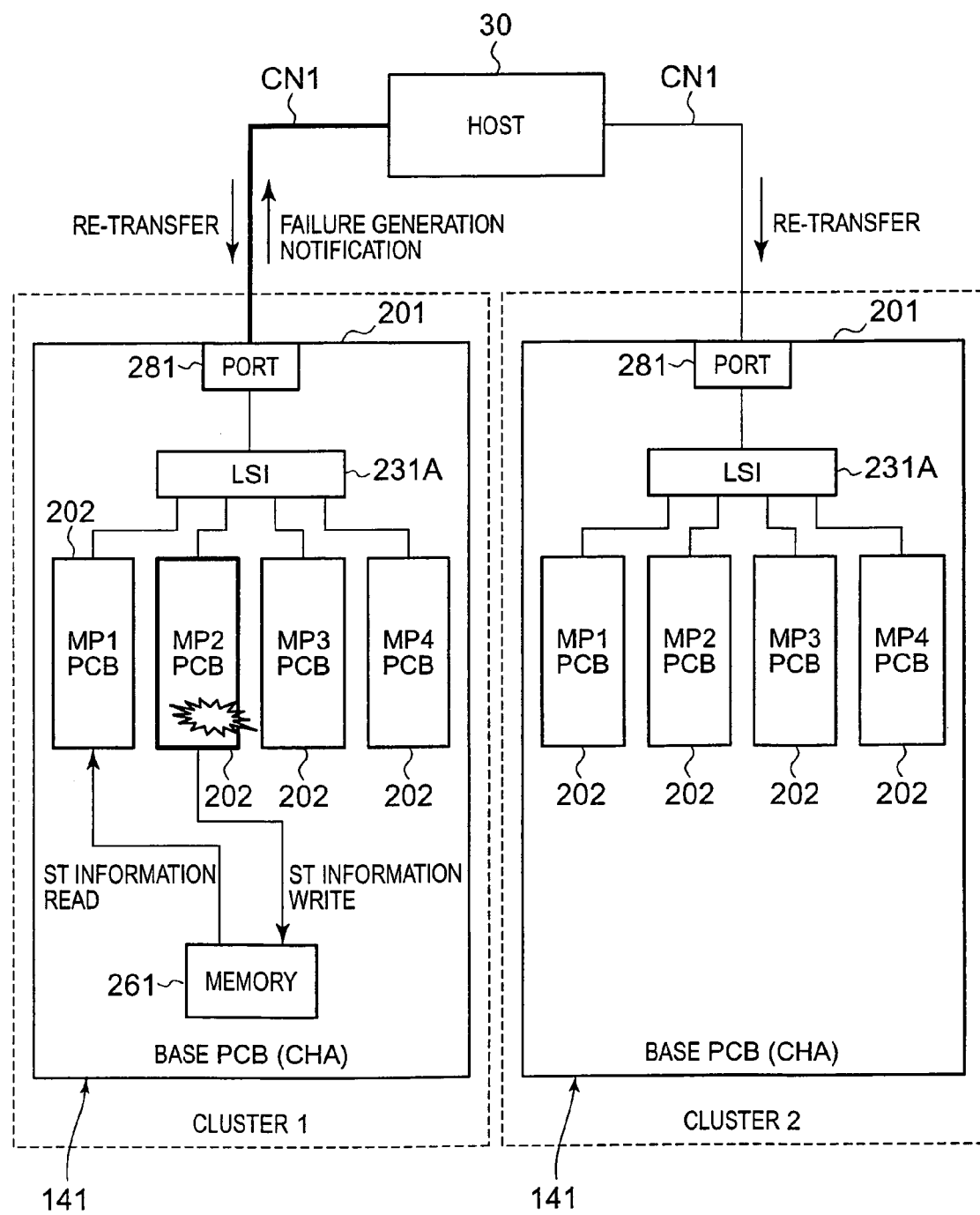
FIG. 15 is a diagram schematically showing the principal parts of a storage apparatus related to a fourth embodiment.

A fourth embodiment will be explained using FIG. 15 and FIG. 16. In this embodiment, a processing method for when a power supply abnormality is detected on an MP board 202 will be disclosed. FIG. 15 is a diagram schematically showing the main constitution of a storage apparatus 10 in accordance with this embodiment.

For example, when a power supply abnormality is detected in any of the MP boards 202 mounted in the CHA 141 o cluster 1, the power supply controller 212 of this MP board 202 immediately shuts down the operation of all the DC/DC power supplies 222, and then stores the status history information 310 in the memory 261. Furthermore, in FIG. 15, status history information 310 is abbreviated as "ST information" to conserve space.

Unlike when a power supply abnormality occurs in the base board 201, when a power supply abnormality occurs in one of the MP boards 202, host 30 access can be processed by way of another MP board 202 disposed on the same base board 201. That is, when a power supply abnormality occurs in the second MP board of cluster 1 ("MP2-PCB" in the figure), an access request from a host 30 can be processed by using any one of the first MP board (MP1-PCB), the third MP board (MP3-PCB), or fourth MP board (MP4-PCB) of cluster 1.

Accordingly, in this case, the host 30 is notified of the occurrence of a power supply failure from a microprocessor 232A of any one of the normal MP boards 202, and an access request from the host 30 is processed inside the same cluster 1.

Figure 16:
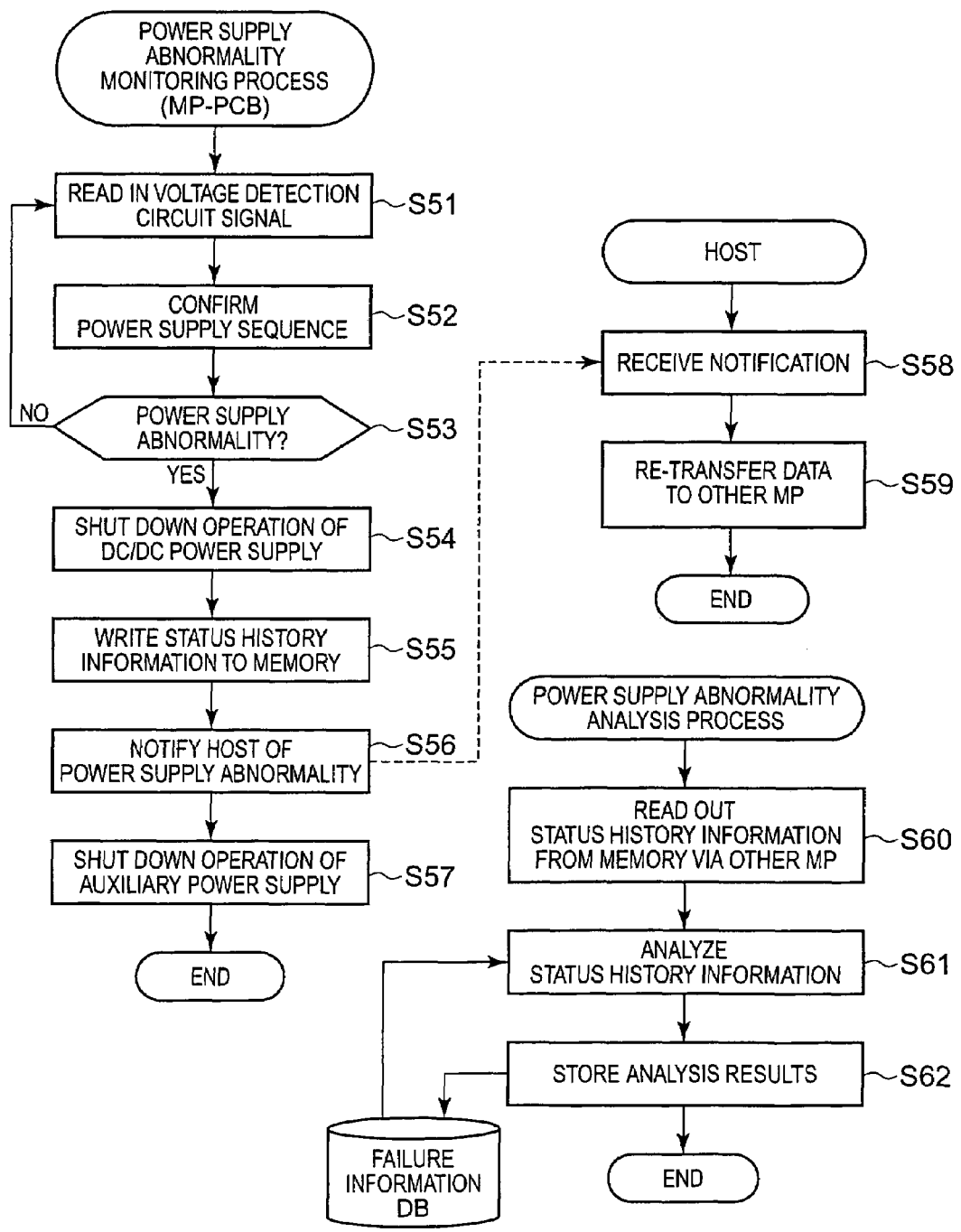
FIG. 16 is a flowchart showing a power supply abnormality monitoring process.

FIG. 16 is a flowchart showing a power supply abnormality monitoring process in accordance with this embodiment. An MP board 202 of cluster 1 (for example, MP2-PCB in FIG. 15) reads in a signal from the voltage detection circuit 242 (S51), compares this signal against a normal power supply sequence (S52), and makes a determination as to whether or not a power supply abnormality has occurred (S53).

When the occurrence of a power supply abnormality is detected (S53: YES), the power supply controller 212 immediately shuts down the operation of all the DC/DC power supplies 222 (S54), and stores the status history information 310 in the memory 261 (S55).

Then, after the microprocessor 232A of any one of the normal MP boards 202 of cluster 1 sends out a notification that a power supply abnormality has occurred (S56), the power supply controller 212 shuts down the operation of the auxiliary power supply 252 (S57).

When the host 30 receives a notification from the CHA 141 of cluster 1 advising of the occurrence of a power supply failure (S58), it selects one of the normal microprocessors 232A of cluster 1, and re-transfers data to this selected microprocessor 232A (S59). The host 30 can select the microprocessor 232A, which notified it of the occurrence of a power supply failure.

In the meantime, when an analysis of a power supply abnormality is performed, the user et al access any of the normal microprocessors 232A of cluster 1 from the management terminal 20 via the SVP 146, and read out the status history information 310 inside the memory 261 by way of this microprocessor 232A (S60). The user et al analyze the status history information 310 of cluster 1 (S61), and store the results of this analysis in the failure information database (S62).

This embodiment, which is constituted as described hereinabove, also demonstrates the same effect as the above-mentioned first embodiment. In addition to this, in this embodiment, when a power supply abnormality occurs in an MP board 202, an access request from a host 30 can be processed by using another, normal MP board 202 disposed on the same base board 201.

Fifth Embodiment

Figure 17:
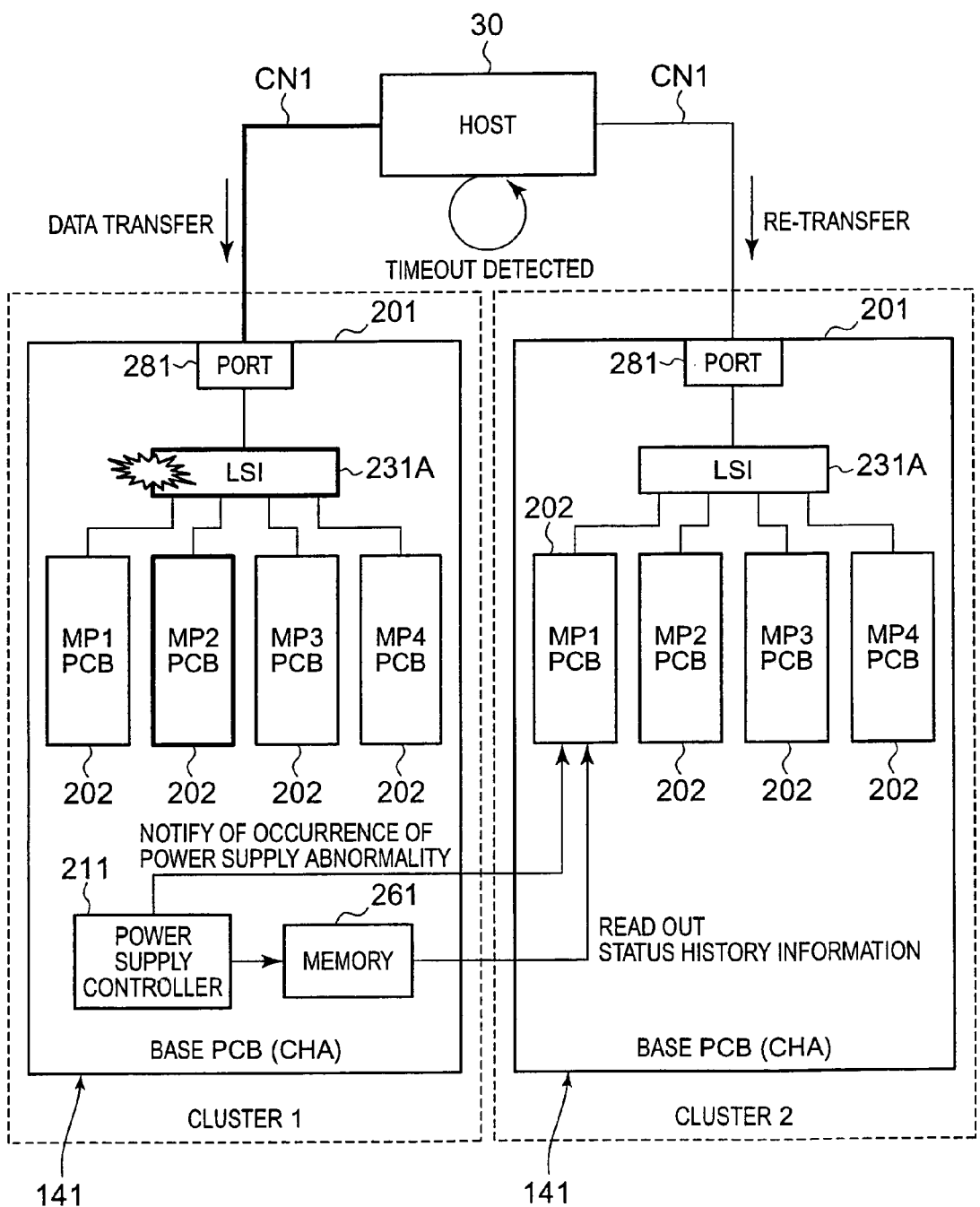
FIG. 17 is a diagram schematically showing the principal parts of a storage apparatus related to a fifth embodiment.

A fifth embodiment will be explained based on FIG. 17 and FIG. 18. In this embodiment, when the present invention comprises a cluster constitution, a host 30 is not notified of the occurrence of a power supply failure even when the occurrence of this power supply failure is detected in the one cluster.

Since this embodiment comprises numerous components in common with the third embodiment, the points of difference with the third embodiment will be the focus of this explanation. FIG. 17 is a diagram schematically showing the main constitution of a storage apparatus 10 according to this embodiment. In this embodiment as well, similar to the above-mentioned third embodiment, when a power supply abnormality is detected in the one cluster 1, the occurrence of this power supply abnormality is notified to the other cluster 2. However, in this embodiment, the CHA 141 of cluster 2 does not notify the host 30 of the occurrence of a power supply abnormality. When a response to an access request to cluster 1 is not returned within a prescribed period of time, the host 30 detects the occurrence of an error, and switches the access path over to cluster 2.

Figure 18:
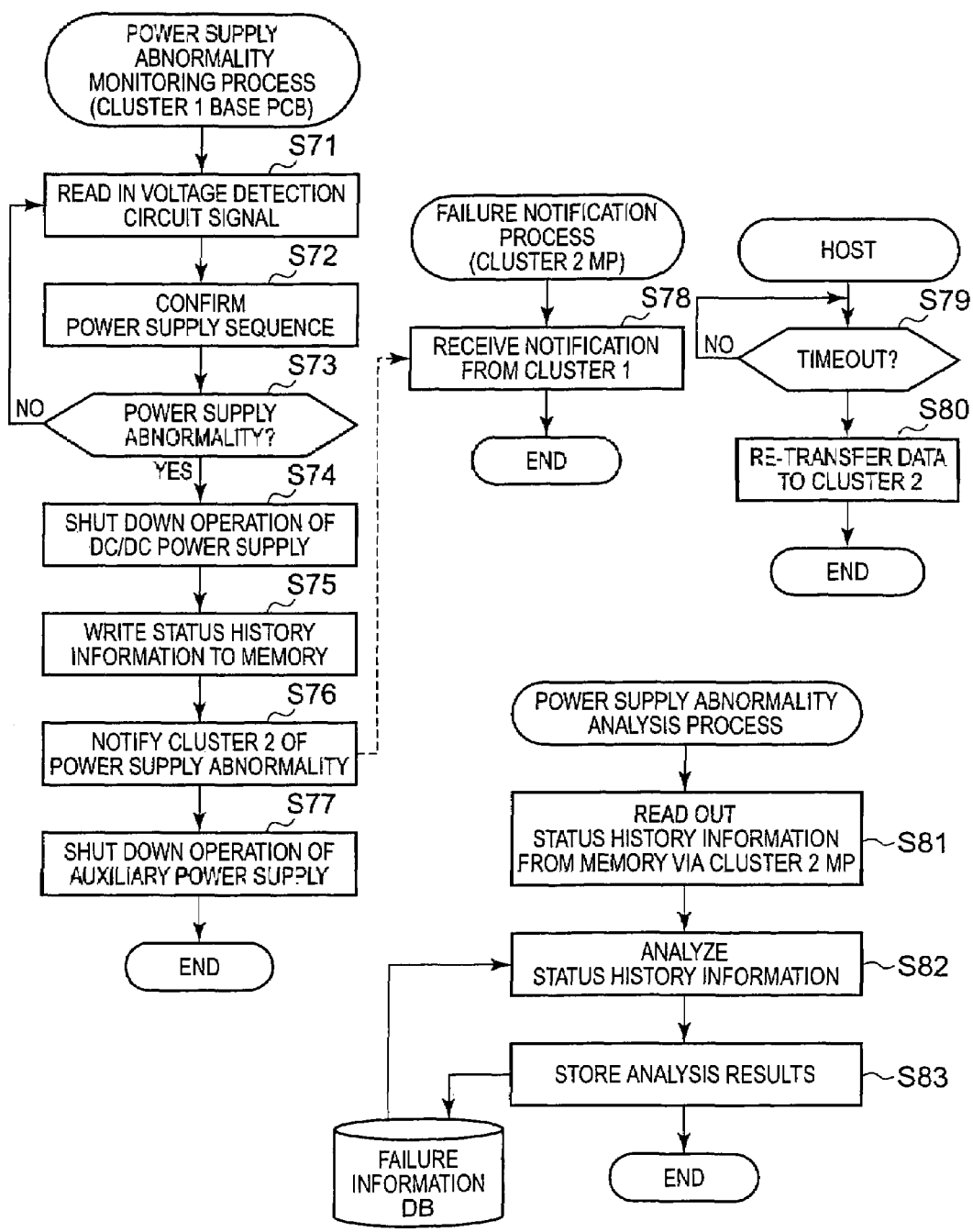
FIG. 18 is a flowchart showing a power supply abnormality monitoring process.

FIG. 18 is a flowchart showing a power supply abnormality monitoring process. S71 through S77 in FIG. 18 are the same as S31 through S37 in FIG. 13, and S81 through S83 in FIG. 18 are the same as S42 through S44 in FIG. 13. Therefore, explanations of S71 through S77 and S81 through S83 will be omitted, and the focus of the explanation will be on the steps other than these.

Even when the CHA 141 of cluster 2 receives a notification from the power supply controller 211 mounted in the base board 201 of cluster 1 advising of the occurrence of a power supply failure (S78), the host 30 is not notified.

Consequently, when an access request issued to the CHA 141 of cluster 1 constitutes a timeout error (S79: YES), the host 30 knows that some sort of failure has occurred in cluster 1. Accordingly, the host 30 switches the access path to the CHA 141 of cluster 2, and transfers the data once again (S80).

This embodiment, which is constituted as described hereinabove, also demonstrates the same effect as the above-mentioned first embodiment. In addition to this, in this embodiment, because the host 30 is not notified of the occurrence of a power supply failure, it is possible to simplify the control constitution compared to that of the third embodiment.

Sixth Embodiment

A sixth embodiment will be explained based on FIG. 19 through FIG. 21. In this embodiment, the constitution is such that status history information 310 is generated and stored in the memory 261 when a prescribed action is detected.

Figure 19:
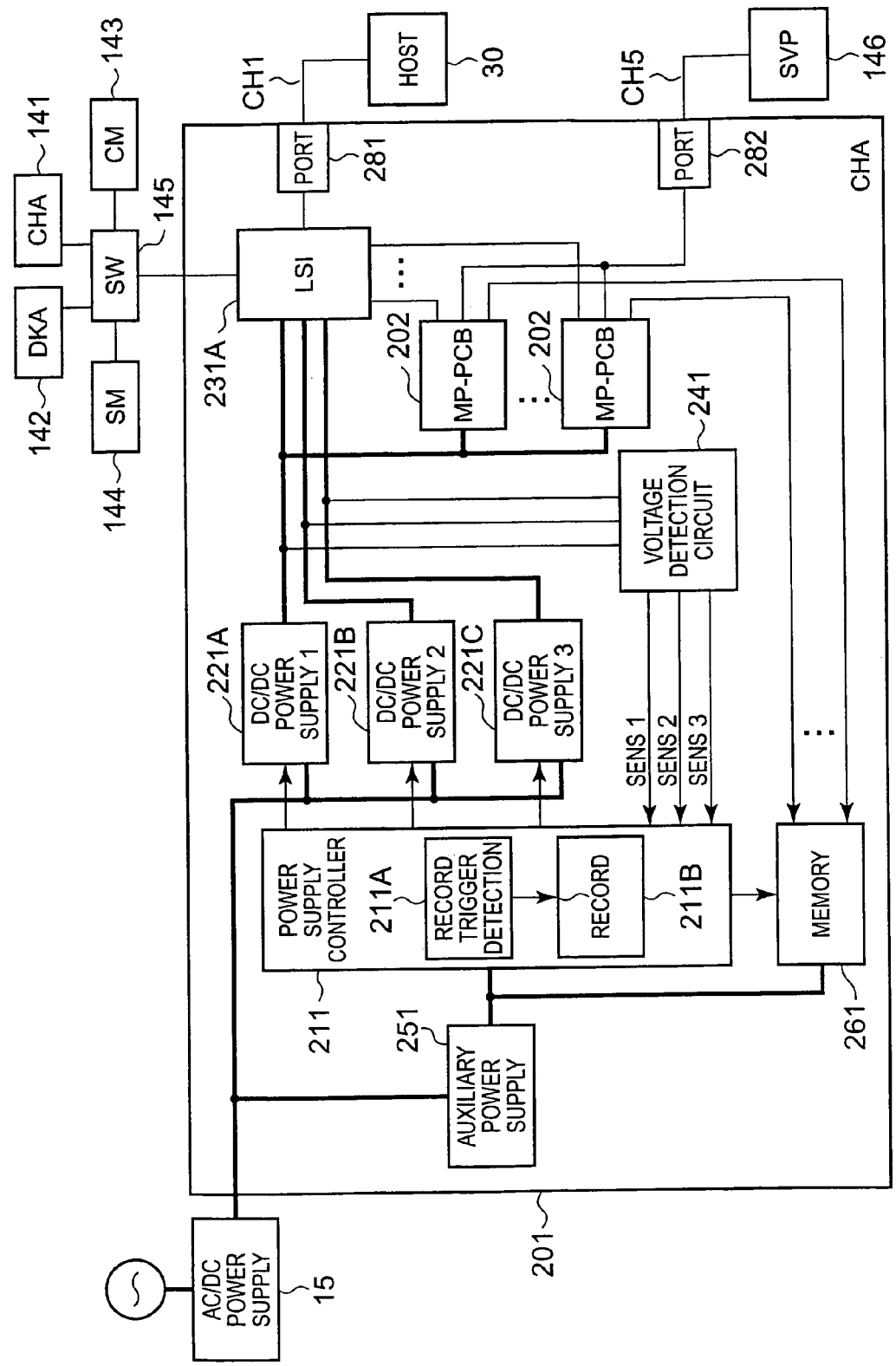
FIG. 19 is a block diagram showing the constitution of a CHA as a data processing board, which is utilized in a storage apparatus related to a sixth embodiment.

FIG. 19 is a block diagram primarily showing the base board 201 within a storage apparatus 10 according to this embodiment. For example, the power supply controller 211 comprises functionality 211A for detecting a trigger for storing status history information 330 in the memory 261, and functionality 211B for storing status history information 330 in the memory 261.

Figure 20:
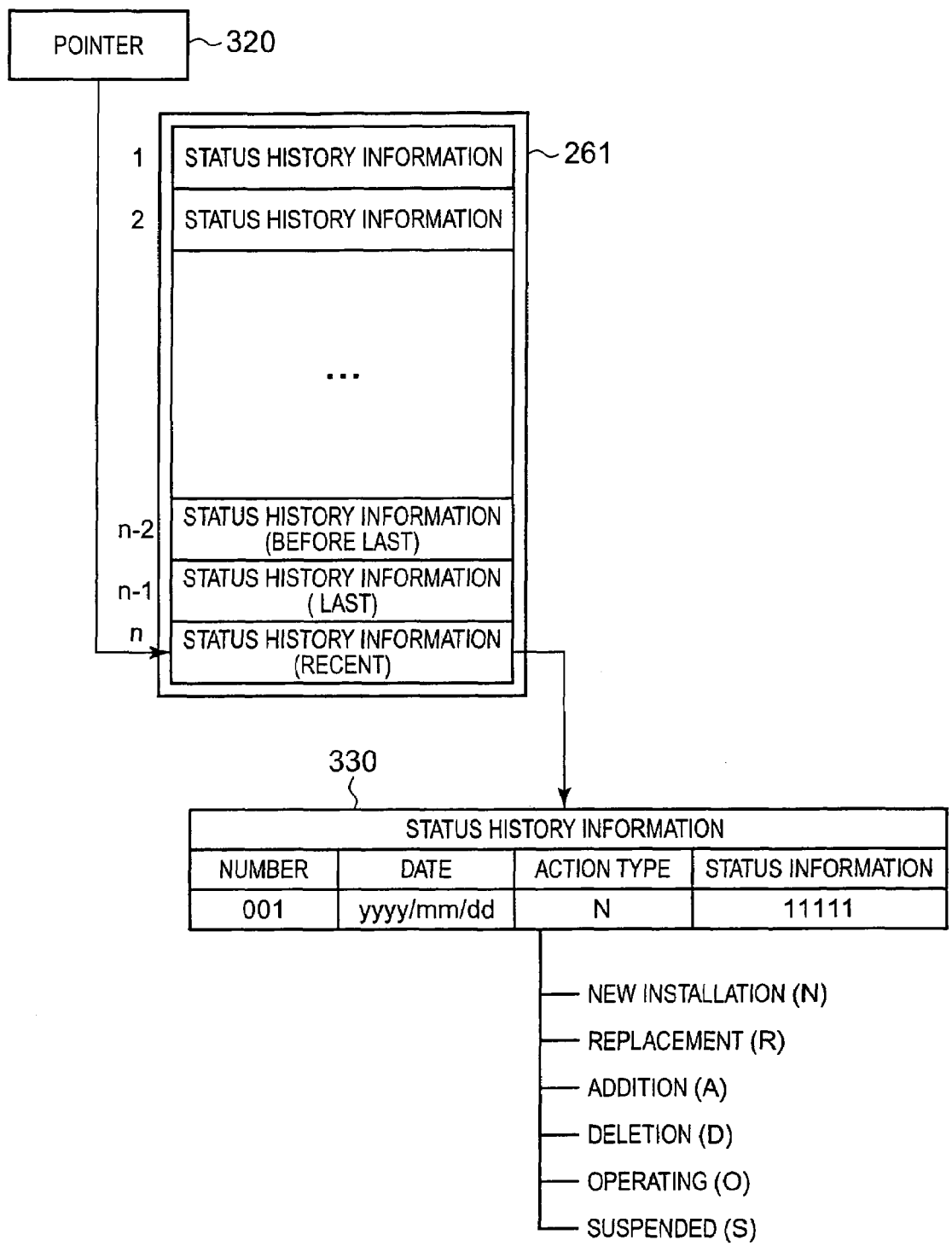
FIG. 20 is a schematic diagram showing the constitution and management method of status history information.

FIG. 20 is a diagram showing the constitution of status history information 330 according to this embodiment. A plurality of status history information 330 can be stored in the memory 261. The pointer 320 indicates the storage destination address of the most recent status history information 330. Status history information 330 is stored in sequence in the memory 261 from this lead address. The pointer 320 value is cleared either when the free space in the memory 261 is gone, or when it falls below a prescribed value, and points to the lead address of the memory 261 once again. The memory 261 is used repeatedly in this way. Therefore, even when the storage capacity of the memory 261 is small, a fixed number of the latest status history information 330 can be efficiently stored at all times.

The status history information 330 of this embodiment, for example, is constituted by corresponding numbers in sequence, a date, and an action type. In addition to these, information for identifying the power supply controller, which generated the status history information 330, can also be added.

The "date" is time information showing the day, month and year in which this status history information 330 can be added. The date is not limited to month and day, but rather can also comprise hour, minute and second information. "Action type" is information showing the types of triggers (actions), which constitute the reason for this status history information 330 being created.

As types of actions, for example, new installation, replacement, addition, deletion, in operation, and suspended can be cited. A new installation is when some new component (a board, device, or software) is disposed in the storage apparatus 10. A replacement is when an existing component of the storage apparatus 10 is replaced with a new component. An addition is when an existing component of the storage apparatus 10 is added, and a deletion is when an existing component of the storage apparatus 10 is removed. In operation is when the storage apparatus 10 is operating normally. Suspended is when the operation of the storage apparatus 10 has been shut down. In the case of "in operation", for example, status history information 330 is created at a preset prescribed cycle.

When these preset actions are detected, the respective power supply controller 211, 212 inside the CHA 141 prepare status history information 330 for the respective DC/DC power supplies 221, 222 under their management, and store it in the memory 261.

Figure 21:
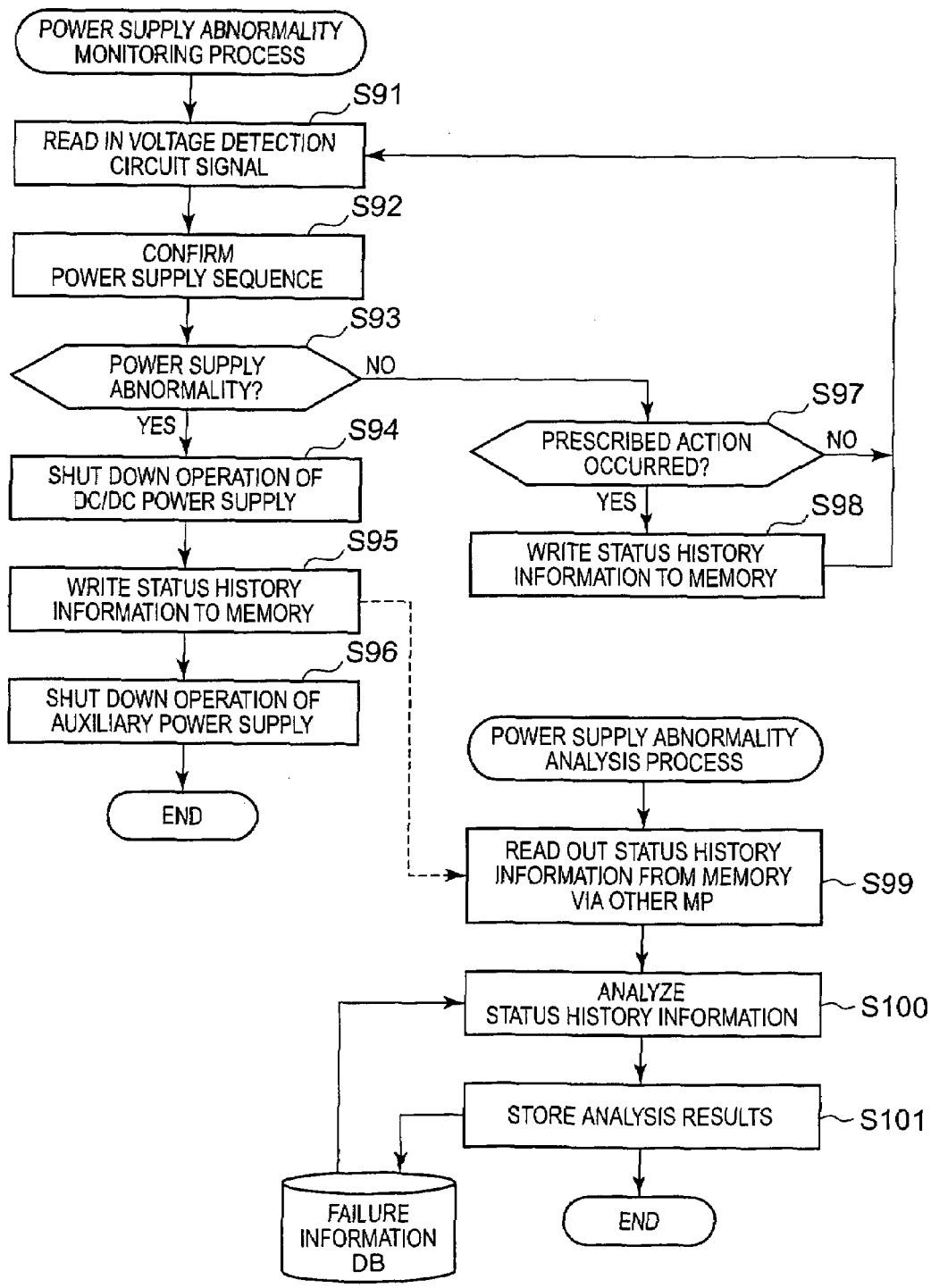
FIG. 21 is a flowchart showing a power supply abnormality monitoring process.

FIG. 21 is a flowchart showing a power supply abnormality monitoring process. Here, for convenience of explanation, a power supply controller 211 of the power supply controllers 211, 212 will be given as an example and explained. The power supply controller 211 reads in a signal of the voltage detection circuit 241 (S91), compares this signal against the normal power supply sequence (S92), and makes a determination as to whether or not a power supply abnormality has occurred (S93).

When a power supply abnormality has occurred (S93: YES), the power supply controller 211 immediately shuts down the operation of all the DC/DC power supplies 221 (S94), prepares status history information 330, and stores it in the memory 261 (S95). Then, the power supply controller 211 shuts down the operation of the auxiliary power supply 251 (S96).

When the power supply is normal (S93: NO), the power supply controller 211 determines whether or not a prescribed action has occurred (S97). As explained hereinabove, when a prescribed action, such as when a new installation, an addition, or other such action is detected, or when a prescribed time has elapsed (S97: YES), the power supply controller 211 prepares status history information 330, and stores it in the memory 261.

Since S99 through S101 of the process for analyzing a power supply abnormality are the same as S17 through S19 in FIG. 7 described in the first embodiment, the explanation thereof will be omitted. Furthermore, an example of the power supply controller 211 of a base board 201 was explained, but a power supply controller 212 of the respective MP boards 202 also prepares status history information 330, and stores it in the memory 261, either when the occurrence of a power supply abnormality is detected, or when a prescribed action occurs, the same as explained hereinabove.

This embodiment, which is constituted as described hereinabove, also demonstrates the same effect as the above-mentioned first embodiment. In addition to this, in this embodiment, status history information 330 can be prepared and stored prior to the occurrence of a power supply failure. Therefore, information related to a predictor of a failure can be collected, and the work of analyzing a power supply failure can be carried out using this predictor information.

In this embodiment, since status history information 330 is prepared when a prescribed action occurs, it is possible to relatively easily diagnose which actions are apt to generate a power supply failure, making it possible to enhance the efficiency of analysis work.

Seventh Embodiment

Figure 22:
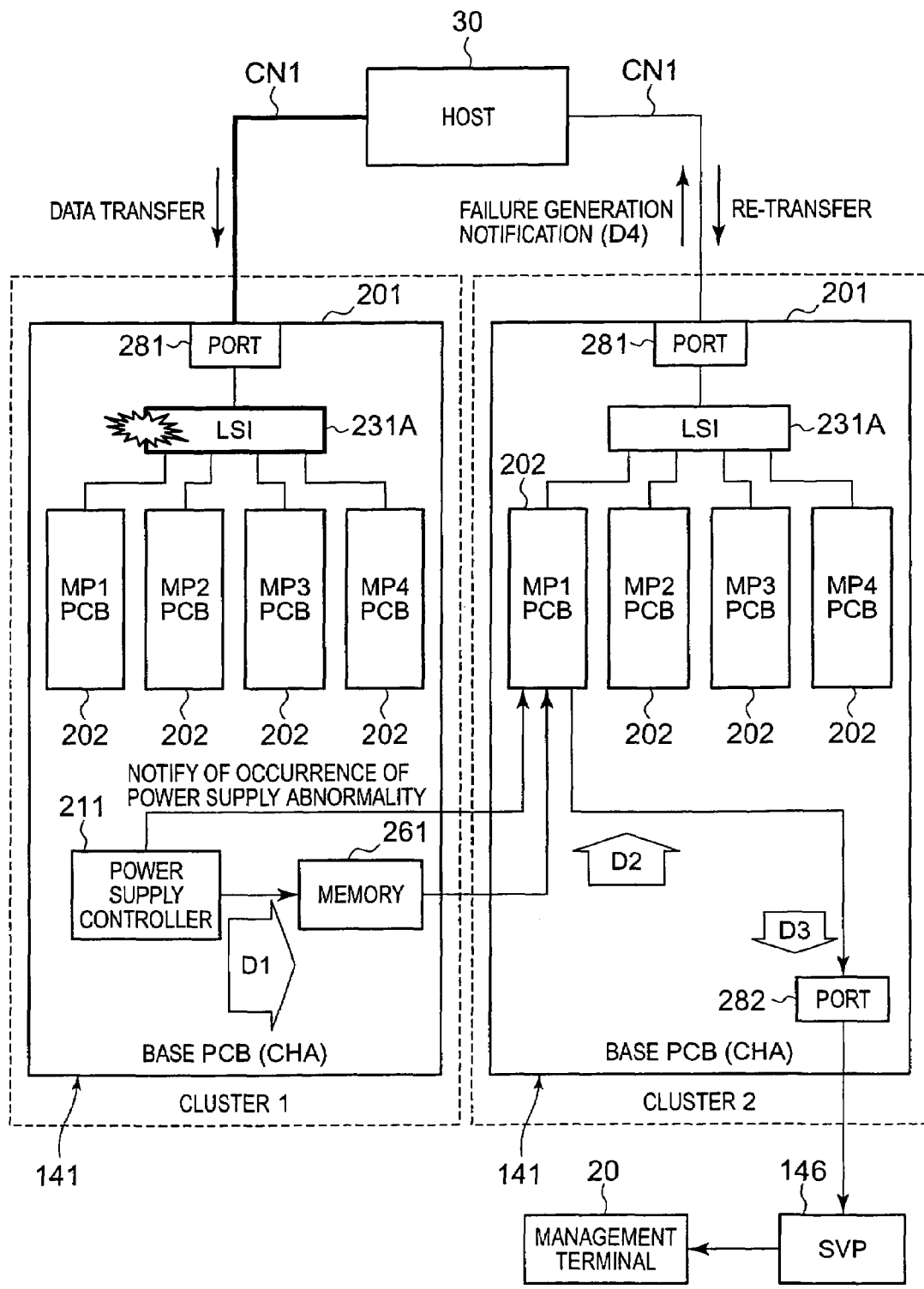
FIG. 22 is a diagram schematically showing the principal parts of a storage apparatus related to a seventh embodiment.

A seventh embodiment will be explained based on FIG. 22 and FIG. 23. In this embodiment, status history information 330 can be selected and transferred. FIG. 22 is a diagram schematically showing an overview of the main constitution of a storage apparatus according to this embodiment.

In this embodiment, an example using the power supply controller 211 will be explained for convenience of explanation. As described in the above-mentioned sixth embodiment, when a prescribed time elapses, or when a prescribed action occurs, the power supply controller 211 prepares status history information 330 and stores it in the memory 261. Therefore, the constitution is such that a plurality of status history information 330 is respectively stored in the memory 261. Status history information 330 as a whole, which is stored in the memory 261, will be D1.

When a power supply abnormality occurs, a microprocessor 232A of another system (for example, cluster 2) reads out, from among all the status history information 330 (D1), only the status history information 330 of the time of the power supply abnormality. This status history information 330 of the time of the power supply abnormality will be D2. This is because, from the standpoint of maintaining the reliability of the storage apparatus 10, the other system microprocessor 232A only needs to know that a power supply abnormality occurred in cluster 1.

Of the status history information 330 (D2) of the time of the power supply abnormality, the SVP 146 acquires from the other system microprocessor 232A only information as to which DC/DC power supply 221 generated the power supply abnormality (D3). This is because it is enough to be able to specify the package that malfunctioned (here, the CHA 141 of cluster 1).

Further, a microprocessor 232A of the other system notifies the host 30 to the effect that a power supply failure occurred in cluster 1. This notification of the occurrence of a power supply failure will be D4.

Thus, in this embodiment, information to be communicated is selected in the order of all status history information 330 (D1)→status history information 330 at the time of a power supply abnormality (D2)→notification to the SVP 146 (D3)→notification to the host 30 (D4), thus reducing the amount of information.

Figure 23:
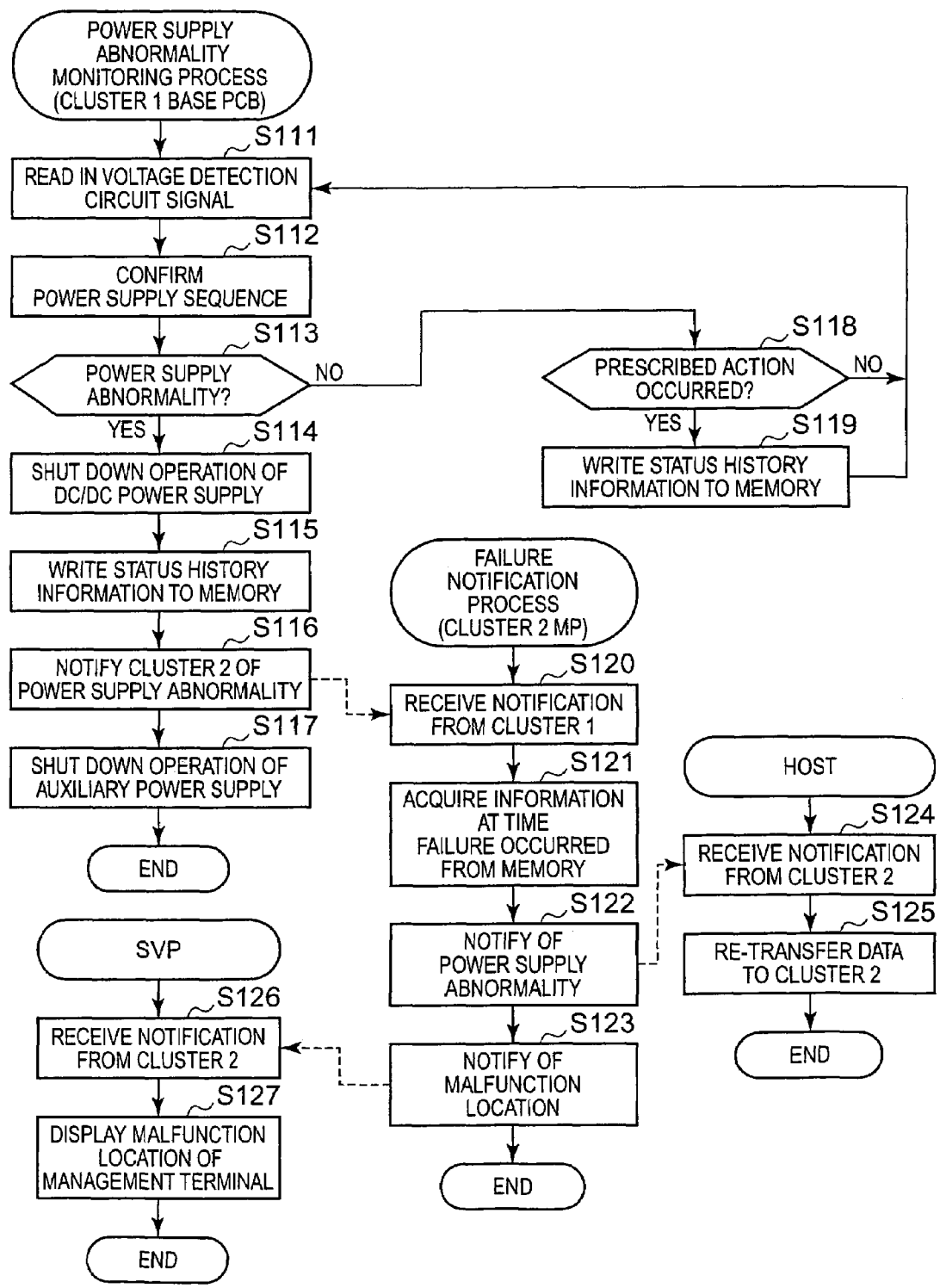
FIG. 23 is a flowchart showing a power supply abnormality monitoring process.

FIG. 23 is a flowchart showing a power supply abnormality monitoring process. For the convenience of explanation, a case in which a power supply abnormality occurs in the base board 201 of cluster 1 will be explained. Similar to the above-mentioned sixth embodiment, the power supply controller 211 of the base board 201 reads in a signal of the voltage detection circuit 241 (S111), compares this signal against the normal power supply sequence (S112), and makes a determination as to whether or not a power supply abnormality has occurred (S113).

When a power supply abnormality has occurred (S113: YES), the power supply controller 211 immediately shuts down the operation of all the DC/DC power supplies 221 (S114), prepares status history information 330, and stores it in the memory 261 (S115). Then, after notifying cluster 2 of the occurrence of a power supply abnormality (S116), the power supply controller 211 shuts down the operation of the auxiliary power supply 251 (S117).

When the power supply is normal (S113: NO), the power supply controller 211 determines whether or not a prescribed action has occurred (S118). When a prescribed action has occurred (S118: YES), the power supply controller 211 prepares status history information 330, and stores it in the memory 261 (S119). Therefore, status history information 330 is accumulated in the memory 261 prior to the occurrence of a power supply abnormality.

When a microprocessor 232A of cluster 2 receives a notification from cluster 1 (S120), it accesses the memory 261 of cluster 1, and reads out the status history information 330 at the time of a power supply abnormality (D2) (S121). Then, the microprocessor 232A of cluster 2 notifies the host 30 to the effect that a power supply failure has occurred (S122). The information notified to the host 30 is D4, and this information D4 comprises information to the effect that a power supply failure has occurred in cluster 1.

Further, the microprocessor 232A of cluster 2 notifies the SVP 146 which package of cluster 1 (in this example, the CHA 141) malfunctioned (S123). The information notified to the SVP 146 is D3, and this information D3 comprises information specifying the package in which the power supply failure occurred.

When the host 30 receives a notification from cluster 2 (S124), it transfers data to one of the CHA 141 of cluster 2 once again (S125). When the SVP 146 receives a notification from cluster 2 (S126), it displays the location of the malfunction and replacement instructions on the user interface 21 of the management terminal 20 (S127).

Furthermore, for the sake of conserving space, the process of analyzing a power supply abnormality will be omitted. However, even in this embodiment, it is possible to analyze a power supply abnormality that occurred in a CHA 141 of cluster 1, the same as S99 through S101 of the above-mentioned sixth embodiment. When analysis processing is carried out, all the status history information 330 (D1) stored in the memory 261 is read out.

This embodiment, which is constituted as described hereinabove, demonstrates the same effect as the above-mentioned sixth embodiment. In addition to this, in this embodiment, the constitution is such that a required range of information is selected prior to each stage of transmission, and transmitted without transmitting all the status history information 330 (D1) stored in the memory 261 as-is. Therefore, the amount of information transmitted can be held down to the minimum required.

Furthermore, the present invention is not limited to the embodiments described hereinabove. A person skilled in the art will be able to make various additions and changes without deviating from the scope of the present invention. For example, it is possible to combine the various embodiments as needed.

Further, in the respective embodiments described above, a CHA 141 was given as an example in explaining the data processing board, but the present invention is not limited to this, and, for example, a DKA 142 can also be utilized.

What is claimed is:

1. The storage apparatus, which provides a storage region to a host machine, said storage apparatus comprising at least one data processing board, wherein
said data processing board comprises:
at least one power supply part, which supplies power to a load;
a detection part, which detects the operating state of said power supply part, and outputs a signal;
at least one or more power supply control part, which controls the operation of said power supply part based on a signal from said detection part;
a storage part for storing monitoring results; and
an auxiliary power supply part for enabling writing information into said storage cart even when the operation of said power supply part has been shut down, and wherein:
said power supply control part is constituted so as to monitor the operating state of said power supply part, store the results of monitoring in said storage part, and shut down the operation of said power supply Part when a failure is detected in said power supply part; and
said power supply control part monitors the operating state of said power supply part at regular intervals, and stores the results of monitoring in said storage part.

2. The storage apparatus, which provides a storage region to a host machine, said storage apparatus comprising at least one data processing board, wherein
said data processing board comprises:
at least one power supply part, which supplies power to a load;
a detection part, which detects the operating state of said cower supply part, and outputs a signal;
at least one or more power supply control part, which controls the operation of said power supply part based on a signal from said detection part;
a storage part for storing monitoring results; and
an auxiliary power supply part for enabling writing information into said storage part even when the operation of said power supply part has been shut down, and wherein
said power supply control part is constituted so as to monitor the operating state of said power supply part, store the results of monitoring in said storage part, and shut down the operation of said power supply part when a failure is detected in said power supply part; and
said power supply control part, upon detecting the occurrence of a failure of said power supply part, shuts down the operation of said auxiliary power supply after storing the monitoring results at the time the occurrence of the failure has been detected in said storage part.

3. A storage system having a storage apparatus, which controls the exchange of data between a host machine and a storage device, and a management apparatus, which is connected to the storage apparatus, wherein
(1) said storage apparatus comprises a first data processing board and a second data processing board for respectively processing the exchange of data between said host machine and/or said storage device;
(2) said first data processing board and said second data processing board are communicatively interconnected, and are respectively constituted comprising a first board, and a plurality of second boards integrally disposed on said first board;
(3) said first board is constituted comprising:
a data transmission circuit for carrying out data transmission;
a plurality of first power supply parts for supplying power to said data transmission circuit;
a first voltage detection part, which detects the respective output voltages of said first power supply parts, and outputs a signal;
a first power supply control part, which controls the operations of said respective first power supply parts based on a signal from said first voltage detection part;
a storage part; and
an interface part for outputting information stored in said storage part,
(4) said each second board is constituted comprising:
a microprocessor circuit;
a plurality of second power supply parts for supplying power to said microprocessor circuit;
a second voltage detection part, which detects respective output voltages of said second power supply parts, and outputs a signal; and
a second power supply control part, which controls the operation of said respective second power supply parts based on signals from said second voltage detection part,
(5) said first power supply control part, under prescribed circumstances, stores results of monitoring the operating states of said respective first power supply parts in said storage part, and
said second power supply control part, under said prescribed circumstances, stores results of monitoring the operating states of said respective second power supply parts in said storage part,
(6) said microprocessor circuit of said first data processing board and said microprocessor circuit of said second data processing board can respectively access said storage part of said first data processing board and said storage part of said second data processing board, and can output said monitoring results stored in said storage parts to said management apparatus, and
(7) said microprocessor circuit of said first data processing board and said microprocessor circuit of said second data processing board can acquire only a portion of information of said monitoring results stored in said storage part.

* * * * *

UNITED STATES PATENT AND TRADEMARK OFFICE
CERTIFICATE OF CORRECTION

PATENT NO. : 7,581,137 B2  Page 1 of 1
APPLICATION NO. : 11/473032
DATED : August 25, 2009
INVENTOR(S) : Okada et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 547 days.

Signed and Sealed this

Fourteenth Day of September, 2010

David J. Kappos
*Director of the United States Patent and Trademark Office*